United States Patent
Sharpe et al.

(10) Patent No.: US 12,554,941 B2
(45) Date of Patent: Feb. 17, 2026

(54) PROCESSING EVENT DATA AND/OR TABULAR DATA FOR INPUT TO ONE OR MORE MACHINE LEARNING MODELS

(71) Applicant: Capital One Services, LLC, McLean, VA (US)

(72) Inventors: Samuel Sharpe, Cambridge, MA (US); Christopher Bayan Bruss, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 165 days.

(21) Appl. No.: 18/441,624

(22) Filed: Feb. 14, 2024

(65) Prior Publication Data

US 2025/0259012 A1 Aug. 14, 2025

(51) Int. Cl.
*G06F 40/40* (2020.01)
*G06F 40/284* (2020.01)

(52) U.S. Cl.
CPC ............ *G06F 40/40* (2020.01); *G06F 40/284* (2020.01)

(58) Field of Classification Search
CPC .............................. G06F 40/40; G06F 40/284
USPC ............................................................ 704/9
See application file for complete search history.

(56) References Cited

U.S. PATENT DOCUMENTS

| | | |
|---|---|---|
| 2012/0101927 A1 | 4/2012 | Leibon et al. |
| 2022/0392047 A1 | 12/2022 | Wheaton et al. |
| 2025/0139440 A1 | 5/2025 | Langford |

OTHER PUBLICATIONS

Wang Zifeng et al. "TransTab: Learning Transferable Tabular Transformers Across Tables", Dec. 6, 2022, pp. 1-14, XP093268182, https://proceedings.neurips.cc/paper_files/paper/2022/file/1377f76686d56439a2bd7a91859972f5-paper-conference.pdf.

Hulsebos Madelon et al. "Models and Practice of Neural Table Representations" Proceedings of the 23rd International Middleware Conference Doctoral Symposium, ACMPUB27, New York, NY, USA, Jun. 4, 2023, pp. 83-89, XP059055012, DOI: 10.1145/3555041.3589411.

Padhi Inkit et al. "Tabular Transformers for Modeling Multivariate Time Series" ICASSP 2021—2021 IEEE International Conference on Acoustics, Speech and Signal Processing (ICASSP), IEEE, Jun. 6, 2021, pp. 3565-3569, XP033954037, DOI: 10.1109/ICASSP39728.2021.9414142.

Schikuta Erich et al. "An Execution Framework for Grid-Clustering Methods" Procedia Computer Science, Elsevier, Amsterdam, NL, vol. 80, Jun. 8, 2016, pp. 2322-2326, XP029565809, ISSN: 1877-0509, DOI: 10.1016/J.Procs.2016.05.430.

Yang Zhen et al. "TEAL: Tokenize and Embed ALL for Multimodal Large Language Models" arXiv.org, Nov. 8, 2023, pp. 1-15, XP093268814, <https://arxiv.org/pdf/2311.04589v1>.

(Continued)

*Primary Examiner* — Thierry L Pham
(74) *Attorney, Agent, or Firm* — Banner & Witcoff, Ltd.

(57) ABSTRACT

Aspects described herein may relate to techniques and/or methods that process certain forms of event data and/or tabular data for input to one or more machine learning models, such as a large language model. Additional aspects may relate to using the output of a large language model as part of a process for detecting fraud based on the event data and/or tabular data. In some variations, the event data and/or tabular data may be processed into data tokens, embeddings, or other forms of data suitable for use as input to a large language model.

20 Claims, 16 Drawing Sheets

(56) References Cited

OTHER PUBLICATIONS

Hongyan Jing et al. "Summarization of noisy documents" Text Summarization Workshop, Association for Computational Linguistics, N. Eight Street, Stroudsburg, PA, 18360 07960-1961 USA, May 31, 2003, pp. 25-32, XP058167427, DOI: 10.3115/1119467.1119471.

Apr. 29, 2025—(WO) International Search Report and Written Opinion—App No. PCT/US2025/013687.

Zhixin Guo et al., "Adapting Prompt for Few-shot Table-to-Text Generation," 2023, arXiv:2302.12468, https://arxiv.org/abs/2302.12468.

Tianyu Liu et al., "Table-to-text Generation by Structure-aware Seq2seq Learning," Nov. 27, 2017, arXiv:1711.09724v1, https://paperswithcode.com/paper/table-to-text-generation-by-structure-aware.

Rong Ye et al., "Variational Template Machine for Data-to-Text Generation," Feb. 13, 2020, arXiv:2002.01127v2, https://paperswithcode.com/paper/variational-template-machine-for-data-to-text-1.

Ankur P. Parikh et al., "ToTTo: A Controlled Table-To-Text Generation Dataset," Oct. 6, 2020, arXiv:2004.14373v3, https://paperswithcode.com/paper/totto-a-controlled-table-to-text-generation.

Heng Gong et al., "TableGPT: Few-shot Table-to-Text Generation with Table Structure Reconstruction and Content Matching," Proceedings of the 28th International Conference on Computational Linguistics, pp. 1978-1988, Barcelona, Spain (Online), Dec. 8-13, 2020, https://paperswithcode.com/paper/tablegpt-few-shot-table-to-text-generation.

Gilbert Badaro et al., "Transformers for Tabular Data Representation: A Survey of Models and Applications," 2023, Transactions of the Association for Computational Linguistics, 11:227-249, https://aclanthology.org/2023.tacl-1.14/.

Stefan Hegselmann et al. "TabLLM: Few-shot Classification of Tabular Data with Large Language Models" International conference on artificial intelligence and statistics PMLR, 2023, <https://arxiv.org/pdf/2210.10723,> Mar. 17, 2023, 33 pages.

PROCESSING EVENT DATA AND/OR TABULAR DATA FOR INPUT TO ONE OR MORE MACHINE LEARNING MODELS

FIELD

Aspects described herein relate generally to machine learning models, such as large language models, and the performance of processes involving machine learning models, event data, and/or tabular data.

BACKGROUND

A machine learning model is often configured for an intended purpose and, in support of that intended purpose, may expect certain types of data as input. For example, a large language model may be configured to perform one or more particular linguistic tasks, such as the generation of language in sentence and/or paragraph form. To generate language in sentence and/or paragraph form, the large language model may be configured in a way that assumes input will take the form of text (sometimes referred to as a prompt) that includes natural language and/or a contextually related sequence of text (sometimes referred to as a chain of prompts) with each item of text in the sequence having its own portion of natural language. However, if the large language model is provided with input that includes data of a different and/or unexpected format (e.g., data that does not include natural language), the output of the large language model may be of poor quality or unsuitable for further use. As one example of poor quality and/or unsuitability, the language in sentence and/or paragraph form output by the large language model may be a poor response to the input and/or unsuitable as a way to process the input for further use. In this way, using a large language model may be difficult.

Moreover, to users of a large language model, the inner workings of the large language model may be unobservable. Put another way, to users of a large language model, only input provided to the large language model and output from the large language model may be observable, but the exact manner in which the large language model performs the one or more particular linguistic tasks may be unobservable. This unobservability may increase the difficulty in using a large language model.

SUMMARY

The following paragraphs present a simplified summary of various aspects described herein. This summary is not an extensive overview, and is not intended to identify key or critical elements or to delineate the scope of any claim. This summary merely presents some concepts in a simplified form as an introductory prelude to the more detailed description provided below.

Aspects described herein may address the above-mentioned difficulties in using machine learning models, such as large language models. Further aspects described herein may improve processes that utilize machine learning models, event data, and/or tabular data. Indeed, aspects described herein may address difficulties in providing certain forms of event data and/or tabular data, as input, to one or more large language models. For example, the event data and/or tabular data may include credit card transactions and/or transactions with a banking account and various aspects described herein may address difficulties in providing such event data and/or tabular data to a large language model. As another example, output of a large language model may be used as part of a process for performing one or more classification tasks and various aspects described herein may improve the performance of the one or more classification tasks.

Some aspects described herein may process the event data and/or tabular data as a way to make such data more suitable for input to a large language model. For example, described herein are various techniques and methods in which event data and/or tabular data are processed into one or more sequential data tokens, embeddings, and other forms of data suitable for use as input to a large language model. As some examples as to how the one or more sequential data tokens may be determined, an alphanumeric transformation may be applied to event data and/or tabular data. A template technique may be applied to the event data and/or tabular data. An embedding projection technique may be applied to the event data and/or tabular data. A clustering technique and/or a grid technique may be applied the event data and/or tabular data. A decision tree technique may be applied to the event data and/or tabular data. After a sequential data token is determined, the sequential data token may be provided, as input, to a large language model and output from the large language model may be used as part of a process for performing one or more classification tasks.

These features, along with many others, are discussed in greater detail below. Corresponding apparatus, systems, and computer-readable media are also within the scope of the disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques that use machine learning models, event data, and/or tabular data. Indeed, aspects described herein may process the event data and/or tabular data as a way to make such data more suitable for input to one or more large language models. Further, output from the one or more large language models may be used as part of one or more classification tasks, such as a process for detecting fraud, among other types of classification tasks. The one or more classification tasks may use one or more machine learning models that are configured to perform the one or more classification tasks.

Figure 1:
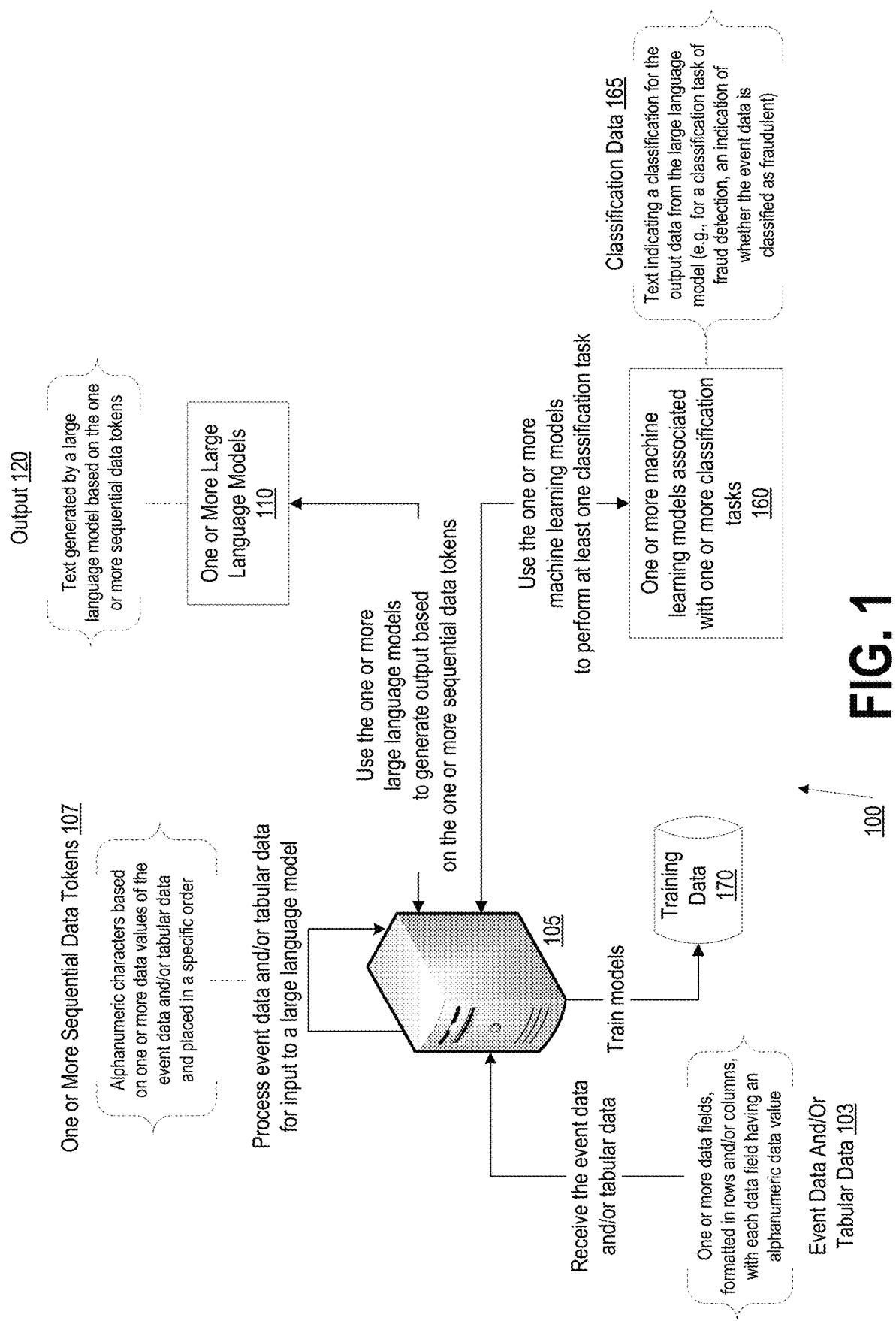
FIG. 1 depicts a block diagram of an example computing environment that, in accordance with various aspects described herein, processes event data and/or tabular data and performs one or more classification tasks based on one or more large language models.

FIG. 1 depicts a block diagram of an example computing environment 100 that processes event data and/or tabular data, and uses one or more large language models among a plurality of machine learning models. As a brief overview, the example computing environment 100 includes a server 105 that may event data and/or tabular data 103 and may perform various processes with other components of the example computing environment 100. As depicted, the other components include one or more large language models 110, one or more machine learning models 160 associated with one or more classification tasks, and a database of training data 170.

Each of the one or more large language models 110 may include a generative language model and/or an extractive language model. Both a generative language model and an extractive language model may be based on a Transformer. A generative language model may generate output data to appear as human-written language (e.g., words, sentences and/or paragraphs generated by the generative language model). An extractive language model may extract output data from pre-existing text (e.g., words, sentences, and/or paragraphs extracted from the pre-existing text). Examples of a suitable generative language model include a Generative Pre-Trained Transformer (GPT), such as GPT-2, GPT-3, GPT-4, or ChatGPT by OpenAI. The GPT may be an off-the-shelf version of a GPT (e.g., ChatGPT) or may be a version of a GPT specifically configured to process one or more specific forms of event data and/or tabular data described herein. A GPT may take, as input, text (sometimes referred to as a prompt) and, in response, the GPT may generate output that includes natural language (e.g., in sentence and/or paragraph form), which may be difficult to discern from human-written language. Additional examples of a generative language model include a Generative Adversarial Network (GAN). Examples of a suitable extractive language model include a Bidirectional Encoder Representations from Transformers (BERT) or a model based on BERT (e.g., Robustly Optimized BERT Pre-training Approach, also referred to as "ROBERTa"). The extractive language model may be pre-trained (e.g., a version of BERT pre-trained using a large corpus of language data) or may be specifically trained to process one or more specific forms of event data and/or tabular data described herein (e.g., a version of BERT trained using a corpus of event data and/or tabular data). Additional examples of an extractive language model include Embeddings from Language Model ("ELMo").

The one or more machine learning models 160 may be configured to perform, or otherwise be used as part of performing, one or more classification tasks. The one or more machine learning models 160 may include, or otherwise be, one or more additional large language models that are configured to perform the one or more classification tasks. For example, one or more extractive language models may be configured to classify output from the one or more large language models 110 as a way to determine whether fraud is detected.

There are many different types of classification tasks that could be performed. In addition to the classification task that classifies output from the one or more large language models 110 as a way to determine whether fraud is detected, other examples of classification tasks may include classifying output from the one or more large language models 110 as a way to determine credit card recommendations, classifying output from the one or more large language models 110 as a way to determine advertisement recommendations, classifying output from the one or more large language models 110 as a way to determine whether to accept or reject a credit card application, and the like.

The database of training data 170 may be a storage medium, or storage device, that stores data suitable for training any, or all, of the one or more large language models 110 and/or the one or more machine learning models 160. The server 105 may access the data of training data 170 when training any, or all, of the one or more large language models 110 and/or the one or more machine learning models 160. In some variations, the server 105 may only train some of the models depicted in FIG. 1. For example, the one or more large language models 110 may be trained by a third party (e.g., a large language model that uses ChatGPT may be trained by OpenAI), while the server 105 may train the one or more machine learning models 160 that are associated with the one or more classification tasks. In this way, the server 105 may be able to perform training processes that are specific to the one or more classification tasks (e.g., use training data relevant to detecting fraud to train a machine-learning model that will perform a classification task for detecting fraud). When training any, or all, of the one or more large language models 110 and/or the one or more machine learning models 160, the server 105 may perform any suitable training process. Examples of suitable training processes may include, or otherwise be based on, next event prediction, masked event modeling (e.g., masked language modeling), contrastive learning (e.g., for comparing different sequences), and the like.

The database of training data 150 may include training data for training generative language models, for training extractive language models, and/or for training machine-learning models that are to perform the one or more classification tasks. The training data may have been collected based on multiple streams and/or sources within the example computing environment 100. For example, the training data may include, or be based on, data for customers of a bank and/or transactions involving the customers and the bank. Further, the training data may be based on any of the techniques described herein that determine a sequential data token. In some variations, for example, the training data may include sequential data tokens that were determined based on applying any of the techniques described herein to the data for customers of the bank and/or transactions involving the customers and the bank.

The server 105 and the other components of the example computing environment 100 are depicted in FIG. 1 as performing various processes in connection with processing the event data and/or tabular data 103 and performing one or more classification tasks. As depicted in FIG. 1, the server 105 may receive event data and/or tabular data 103; process the event data and/or tabular data 103 for input to a large language model; use the one or more large language models 110 to generate output based on the one or more data tokens; and use the one or more machine learning models 160 to perform at least one classification task.

The event data and/or tabular data 103 may be formatted in rows and/or columns of one or more data fields. The one or more data fields may each have an alphanumeric data value of an expected type. Examples of the alphanumeric data values and expected types will be described below. In general, the alphanumeric data values and expected types may depend on what information the event data and/or tabular data 103 is intended to convey. As a brief example, event data that is intended to convey information about a credit card transaction may include expected types that differ from event data that is intended to convey information about a click stream event. Put another way, first event data may include one or more alphanumeric data values and/or one or more data fields that are for a first event (e.g., an account transaction), but a second event (e.g., click stream event) may result in second event data that includes different alphanumeric data values and/or different data fields. For simplicity, event data and tabular data may be used interchangeably herein.

The event data and/or tabular data 103 may include data associated with transactions with an account, such as a credit card account, banking account (e.g., a savings account, debit account, etc.), or other type of account. In this way, the one or more data fields of the event data and/or tabular data 103 may each include an alphanumeric data value of an expected type for an account transaction. For example, the event data and/or tabular data 103 may have data values that indicate a merchant identifier, an amount of the credit card transaction, whether a credit card was physically present for the credit card transaction, and the like. As another example, the event data and/or tabular data 103 may have data values that indicate a type of account (e.g., a credit card account, a banking account, checking account, etc.); an amount for transaction with the account (e.g., an amount of money to withdraw or deposit from the account); whether the transaction was automatic or manual (e.g., an automated withdrawal or a manual withdrawal initiated by a user of the account). The server 105 may be operated by a provider of the credit card account or the banking account (e.g., a bank that provides the credit card account or the banking account).

The event data and/or tabular data 103 may include click stream data generated based on one or more user interactions with a user interface. The user interface may be associated with an account, such as a credit card account or banking account. In this way, the one or more data fields of the event data and/or tabular data 103 may each include an alphanumeric data value of an expected type for a click stream event. For example, the event data and/or tabular data 103 may include data values that indicate an identifier for the click stream event (e.g., a withdrawal event where a user, via one or more user interactions, attempts to withdraw money from their account); a time stamp for the click stream event (e.g., an indication of a time at which the one or more user interactions took place); a type of platform associated with the click stream event (e.g., a browser or operating system in which the one or more user interactions took place); and the like. The one or more user interactions may have been made via a website, mobile application, or other software of the provider of the account (e.g., a bank's website, mobile application, or other software that provides a user access to their account).

The above examples where the event data and/or tabular data 103 may include data associated with transactions with an account and/or click stream data are only two examples of the various types of events that may be indicated by the event data and/or tabular data 103. Event data and/or tabular data 103 may include one or more data fields and/or one or more data values for many different types of events in addition to the above two examples.

After the server 105 receives the event data and/or tabular data 103, the server may proceed to perform one or more processes based on the event data and/or tabular data 103. For example, the server 105 may process the event data and/or tabular data 103 for input to a large language model. Based on this processing, the server 105 may determine one or more sequential data tokens 107. In some variations, the one or more sequential data tokens 107 may include alphanumeric characters based on one or more data values of the event data and/or tabular data 103. Further, the various pieces of information may be placed in the one or more sequential data tokens 107 in a specific order (e.g., the pieces of information are in a specific sequence). Many details and examples of the one or more sequential data tokens 107, and the various ways in which the server 105 may determine the one or more sequential data tokens 107, will be discussed below in connection with FIGS. 2-8. More particularly, the examples provided below illustrate various techniques that may be applied to the event data and/or the tabular data 103 to determine the one or more sequential data tokens 107. The various techniques may expand, refine, transform, or otherwise modify any or all data values of the event data and/or tabular data 103. The expansion, refinement, transformation, or modification of a data value may be performed in a supervised manner. A supervised manner may use data extracted from prior event data as a basis for the expansion, refinement, transformation, or modification. In some variations, an optimizing process may be performed on the data extracted from the prior event data. The expansion, refinement, transformation, or modification of a data value may be performed in an unsupervised manner (e.g., not using data extracted from prior event data as a basis for the expansion, refinement, transformation, or modification). The expansion, refinement, transformation, or modification of a data value may be performed using pre-existing vocabulary or some other pre-existing data representation for expanding, refining, transforming, or modifying a data value. The expansion, refinement, transformation, or modification of a data value may be performed based on an embedding space that, for example, projects a data value into the embedding space. An embedding space may be where data is represented as a vector as a way to capture one or more relationships between the data and semantic meaning between the data.

Additionally, the one or more sequential data tokens 107, if compared to the event data and/or tabular data 103, may be more suitable for use as input to a large language model than the event data and/or tabular data 103 and may improve the quality of output provided by the large language model. In this way, output generated by a large language model based on the one or more sequential data tokens 107 may be more suitable for use as part a classification task than the event data and/or tabular data 103 and may produce more accurate results of the classification task.

As also depicted in FIG. 1, the server 105 may use one or more large language models 110 to generate output 120 based on the one or more sequential data tokens 107. In some variations, the output 120 may include text generated, by one of the one or more large language models 110, based on the one or more data tokens 120 (e.g., text in sentence and/or paragraph form that was generated based on the one or more data tokens 120).

As also depicted in FIG. 1, the server 105 may use one or more machine learning models 160 to perform at least one classification task. As shown in FIG. 1, performing a classification task results in classification data 165. In some variations, the classification data 165 may include text indicating a classification for the output data 120. For example, if the classification task is for detecting fraud, the classification data 165 may include an indication of whether the event data is classified as fraudulent (e.g., "Fraud is detected" or "Fraud is not detected"). The classification data 165 may also include data that indicates the event that formed the basis for the classification data 165 (e.g., data indicating a credit card transaction, an account transaction, click stream event, and the like). The classification data 165 may be sent to another computing system to allow further action to be taken (not shown in FIG. 1). For example, the classification data 165 may be sent to a computer device and displayed on a screen for viewing by a user. Upon viewing the classification data 165, the user may act on the indication that fraud was detected (e.g., deactivate the credit card, contact the provider of the credit card to initiate a service call related to the fraud, and the like).

The flow of data that results based on the processes performed by the server 105 illustrates a few ways in which classification tasks, such as fraud detection, can be improved by various aspects described herein. For example and as shown in FIG. 1, the event data and/or tabular data 103 for a single event (e.g., data indicating a single credit card transaction) may be processed into a specific format and provided to the one or more large language models 110 as input. The output from the one or more large language models 110, which is based on the single event, may then be sent for use as input to the one or more machine learning models 160, which are associated with one or more classification tasks. The one or more classification tasks may then be performed based on the output from the one or more large language models 110. This flow of event data and/or tabular data 103 for a single event differs from arrangements that, for example, accumulate event data and/or tabular data over many events and then perform one or more classification tasks based on the accumulated events. More particularly, the aspects described herein, such as a classification task for determining fraud, may be performed based on event data and/or tabular data 103 for a single event (e.g., a single credit card transaction) as opposed to classification tasks that are performed based on events accumulated over a window of time (e.g., a month of credit card transactions) or some other accumulation technique (e.g., 100 of the most recent credit card transactions).

Having discussed the example computing environment 100 of FIG. 1, example methods of different techniques for processing event data and/or tabular data, and for performing one or more classification tasks will now be discussed. FIGS. 2A, 3A, 4A, 5A, 6A, and 7A provide example methods of various techniques for processing event data and/or tabular data. FIGS. 2B, 3B, 4B, 5B, 6B, 7B, and 8 provide visual examples of the various techniques for processing the event data and/or tabular data. FIG. 9 provides an example method for performing a classification task. The example methods of FIGS. 2A, 3A, 4A, 5A, 6A, 7A, 8 and 9 may be performed by the server 105 of the example computing environment 100 of FIG. 1 and/or some other computing device. For simplicity, each of the example methods of FIGS. 2A, 3A, 4A, 5A, 6A, 7A, 8 and 9 will be discussed in terms of being performed by one or more computing devices. Additionally, for simplicity, the examples of FIGS. 2A, 2B, 3A, 3B, 3C, 4A, 4B, 5A, 5B, 6A, 6B, 7A, 7B, 8, and 9 will be discussed in terms of event data instead of event data and/or tabular data. Again, as used herein, event data and tabular data may be used interchangeably. Therefore, any example directed to event data also applies to tabular data.

Additionally, the examples of FIGS. 2A, 2B, 3A, 3B, 3C, 4A, 4B, 5A, 5B, 6A, 6B, 7A, 7B, and 8 are with respect to receiving, and processing, event data for a single event. The example of FIG. 9 is with respect to receiving generative text associated with a single event. All these examples being discussed with respect to a single event is to further show how the flow of event data for a single event differs from arrangements that, for example, accumulate event data over many events and then perform one or more classification tasks based on the accumulated events.

Figure 2A:
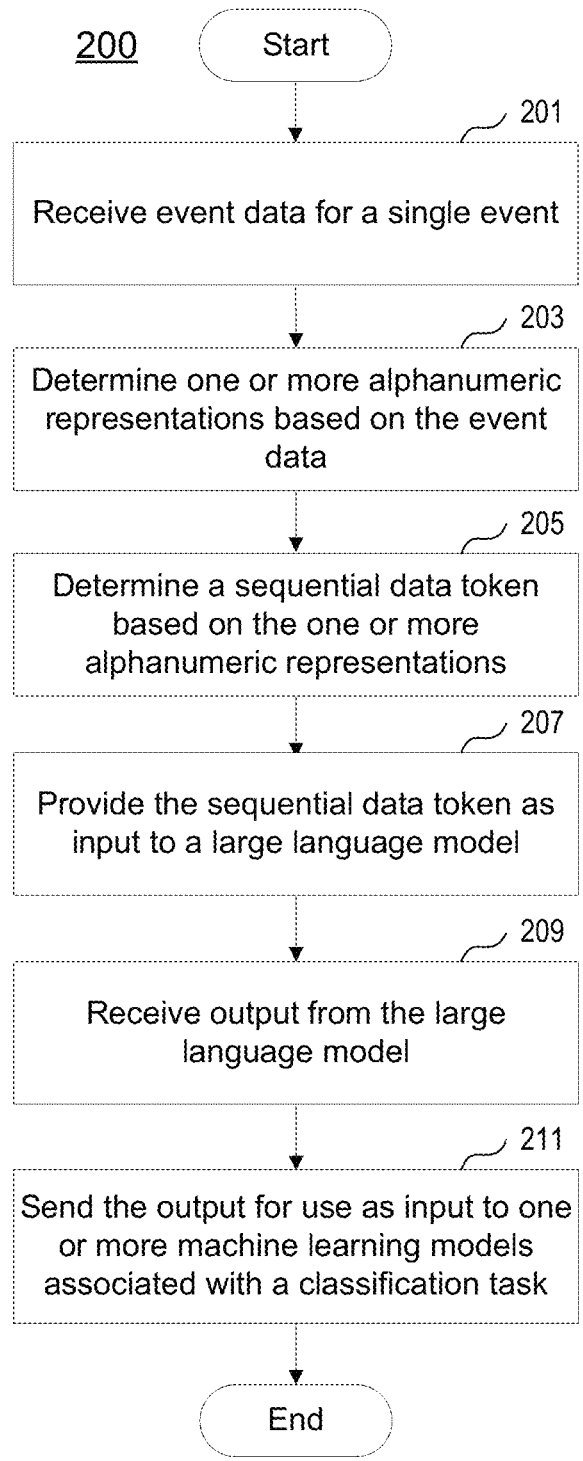
FIG. 2A depicts an example method that processes event data and/or tabular data based on an alphanumeric transformation technique in accordance with various aspects described herein.

FIG. 2A depicts an example method 200 that processes event data for a single event based on an alphanumeric transformation technique. Method 200 may be implemented in suitable computer-executable instructions and performed by one or more computing devices.

At step 201, the one or more computing devices may receive event data for a single event. The event data may include one or more data fields for the single event and each of the one or more data fields may have its own data value. What types of data fields are included by the event data depends on the type of event. As some examples of the data fields that may be included in event data, Table I is provided below and includes examples for an event of a credit card transaction, an event of an account transaction, and a click stream event. The examples of Table 1 are only some of the types of events that may be included in event data and only some examples of data fields, and data values, that may be included in event data. The discussion above with respect to the event data and/or tabular data 103 of FIG. 1 also provides additional examples as to the data fields and data values that may be included in event data. Additionally, for a particular example type of event provided in Table I, the event data may include any, or all, of the data fields for that type. For any example type of event provided in Table I, the event data may include additional data fields that are not shown in Table I for that type of event and/or may include different data fields than those shown in Table I for that type of event.

TABLE I

| Type of Event | Example Data Field | Example Data Value |
|---|---|---|
| Credit card transaction | Merchant identifier | Alphanumeric value that uniquely identifies the merchant involved in the credit card transaction. |
| Credit card transaction | Amount | Numeric value that indicates the price of the good or service being purchased via the credit card transaction |
| Credit card transaction | Card present | Boolean value indicating whether the credit card is physically present for the credit card transaction |
| Credit card transaction | Card number | Numeric value that indicates the credit card number involved in the credit card transaction |
| Credit card transaction | Time stamp | Alphanumeric value that indicates a time of day and/or date at which the credit card transaction was initiated with the merchant |
| Account transaction | Balance | Numeric value that indicates the current amount in the account if the account is a banking account, or a numeric value that indicates the current balance if the account is a credit card account |
| Account transaction | Amount | Numeric value that indicates an amount being withdrawn or deposited to the account if the account is a banking account, or a numeric value that indicates an amount of a payment if the account is a credit card account |
| Account transaction | Type | Alphanumeric value that indicates a type of the account transaction (e.g., a credit card payment, a withdrawal from a savings account, a deposit to a debit account, and the like). |
| Account transaction | Hold | Boolean value indicating whether the amount of the transaction is on hold (e.g., waiting for the payment to clear from another bank) |
| Account transaction | Automatic | Boolean value indicating whether the account transaction is an automatic transaction previously established to be performed at a certain date by a user of the account |
| Account transaction | Manual | Boolean value indicating whether the account transaction is a manual transaction being performed by a user of the account |
| Click stream | Widget identifier | An alphanumeric identifier of a user interface widget (e.g., button, picker, text entry, etc.) that a user interacted with via a user interface that is being displayed on a computing device of the user (e.g., pressed the button via the user interface using a mouse or touch screen of the user's computing device) |
| Click stream | Browser identifier | An alphanumeric identifier of a browser that is displaying the user interface on the computing device of the user |
| Click stream | Operating system identifier | An alphanumeric identifier of an operating system of the computing device of the user |
| Click stream | User input | An alphanumeric identifier indicating input provided by the user via the user interface (e.g., text inserted into a text entry widget that indicates a payment amount for a credit card account) |

TABLE I-continued

| Type of Event | Example Data Field | Example Data Value |
|---|---|---|
| Click stream event | Time stamp | Alphanumeric value that indicates a time at which a user interaction took place (e.g., a time at which the user pressed a button via the user interface) |

At step 203, the one or more computing devices may determine one or more alphanumeric representations based on the event data. This determination may be performed by transforming any or all of the data values included by the event data into the one or more alphanumeric representations. In some variations, the alphanumeric representations may be formatted as a string of text. In general, the alphanumeric representations may differ from the data values in one or more ways. For example, when performing the transformations on the data values, the one or more computing devices may compare a data value to one or more thresholds and determine an alphanumeric representation that indicates a result of the comparison. As one particular example, an amount of a credit card transaction may be compared to an amount threshold and the alphanumeric representation may indicate whether the amount is above or below the amount threshold (e.g., for an amount with a data value of 100, an amount threshold of 250, the alphanumeric representation may be "<250" because the amount of 100 is less than the amount threshold of 250). Other types of transformations may be performed. For example, numeric values may be converted to a text format. As another example, a data value may be mapped, or expanded, to a text format (e.g., a merchant identifier may be mapped to the merchant's actual name in text format). Further examples of these transformations and the determination of step 203 will be discussed below in connection with FIG. 2B.

At step 205, the one or more computing devices may determine a sequential data token based on the one or more alphanumeric representations. The sequential data token may include the one or more alphanumeric representations in a particular order. For example, if the one or more alphanumeric representations includes an alphanumeric representations for a merchant identifier (e.g., "Merchant ABC"), another alphanumeric representation for a comparison between an amount of a credit card transaction (e.g., "<250"), and yet another alphanumeric representation for whether the credit card was physically present for the transaction (e.g., "cardnotpresent"), the one or more computing devices may determine a sequential data token that combines those three alphanumeric representations together in a particular order (e.g., the sequential data token may be "Merchant ABC<250cardnotpresent" or "<250Merchant-ABCcardnotpresent"). Additionally, the sequential data token may include separator text between each pair of alphanumeric representations. For example, if the one or more alphanumeric representations includes an alphanumeric representations for a merchant identifier (e.g., "Merchant ABC"), another alphanumeric representation for a comparison between an amount of a credit card transaction (e.g., "<250"), and yet another alphanumeric representation for whether the credit card was physically present for the transaction (e.g., "cardnotpresent"), the one or more computing devices may determine a sequential data token that includes separator text between each pair of those three alphanumeric representations (e.g., if the separator text is "_", the sequential data token may be "Merchant ABC_<250_cardnotpresent" or "<250_MerchantABC_cardnotpresent").

In some variations, the one or more computing devices may determine the order of the one or more alphanumeric representations using predefined sequencing criteria and the type of the single event. This predefined sequencing criteria may define orders of the alphanumeric representations for the various types of events (e.g., a first order for an event of a credit card transaction, a second order for an event of an account transaction, a third order for a click stream event, and the like). In this way, determining the sequential data token may be further based on the predefined sequencing criteria and/or a type of the single event. In some instances, determining the sequential data token based on the predefined sequencing criteria may result in differences between the order of the one or more alphanumeric representations in the sequential data token and the order of the data fields included by the event data. For example and using the example data fields of Table I for a credit card transaction, event data may order data fields as follows: card number, merchant identifier, amount, card present, and time stamp. The one or more computing devices may have previously determined an alphanumeric representation for each of those data fields as follows: "123456789" for the card number, "Merchant ABC" for the merchant identifier, "<250" for the amount, "cardnotpresent" for card present, and "07132023at330PM" for the time stamp. Based on the predefined sequencing criteria, the one or more computing devices may determine a sequential data token that orders those alphanumeric representations (and insert separator text of "_" between pairs of alphanumeric representations) as follows: "07132023at330PM_123456789_Merchant ABC_<250_cardnotpresent"). This example sequential data token, as compared to the order of the example event data, places the alphanumeric representation for the time stamp in a different place in the order (e.g., the alphanumeric representation for the time stamp occurs first in the sequential data token, while the data field for the time stamp occurs last in the event data). Such differences between the order of the sequential data token and the order of the event data may result in improving the quality of output from the large language model that will eventually receive the sequential data token.

In other variations, the one or more computing devices may determine the order of the one or more alphanumeric representations based on the order of the data fields included by the event data. For example, the one or more computing devices may preserve the order of the event such that there are no differences between the order of the one or more alphanumeric representations in the sequential data token and the order of the data fields included by the event data. As a particular example that uses the example data fields of Table I for a credit card transaction, event data may order data fields as follows: card number, merchant identifier, amount, card present, and time stamp. The one or more computing devices may have previously determined an alphanumeric representation for each of those data fields as follows: "123456789" for the card number, "Merchant ABC" for the merchant identifier, "<250" for the amount, "cardnotpresent" for card present, and "07132023at330PM" for the time stamp. Based on the order of the data fields, the one or more computing devices may determine a sequential data token that orders those alphanumeric representations (and insert separator text of "_" between pairs of alphanumeric representations) as follows: "123456789_Merchant ABC_<250_cardnotpresent_07132023at330PM"). This example sequential data token, as compared to the order of the example event data, places each alphanumeric representation in the same place as the order for the event data.

Additionally, in determining the sequential data token, the one or more computing devices may further process the sequential data token to be in a format expected by a large language model. Such further processing may depend on the type of large language model that will eventually receive the sequential data token. For example, if the large language model expects input to be in the format of an embedding vector, the one or more computing devices may send the sequential data token (e.g., "07132023at330PM_123456789_Merchant ABC_<250_cardnotpresent") to an embedding vector encoder, or other implementation, that will convert the sequential data token to an embedding vector (e.g., encode "07132023at330PM_123456789_Merchant ABC_<250_cardnotpresent" as an embedding vector). Examples of an embedding vector encoder, or implementation, that will convert the sequential data token to an embedding vector include word2vec, GloVe (Global Vectors for Word Representation), and FastText. The one or more computing devices may use the resulting embedding vector as the sequential data token.

As another example, if the large language model expects input to be in the format of natural language (e.g., text that appears as if it was written by a human), the one or more computing devices may process the sequential data token such that the alphanumeric representations are in an expanded form that more closely resembles natural language. This may be performed by mapping the alphanumeric representations to words. As one particular example, the sequential data token of "07132023at330PM_123456789_Merchant ABC_<250_cardnotpresent" may be expanded to "Jul. 13, 2023 at 3:30 PM, 123456789, Merchant ABC, less than $250, and card not present."). The one or more computing devices may use the resulting expanded form as the sequential data token. Additionally, in some variations, the expanded form may be sent to an embedding vector encoder, or other implementation, that will convert the expanded form to an embedding vector. The one or more computing devices may use the resulting embedding vector of the expanded form as the sequential data token.

Figure 2B:
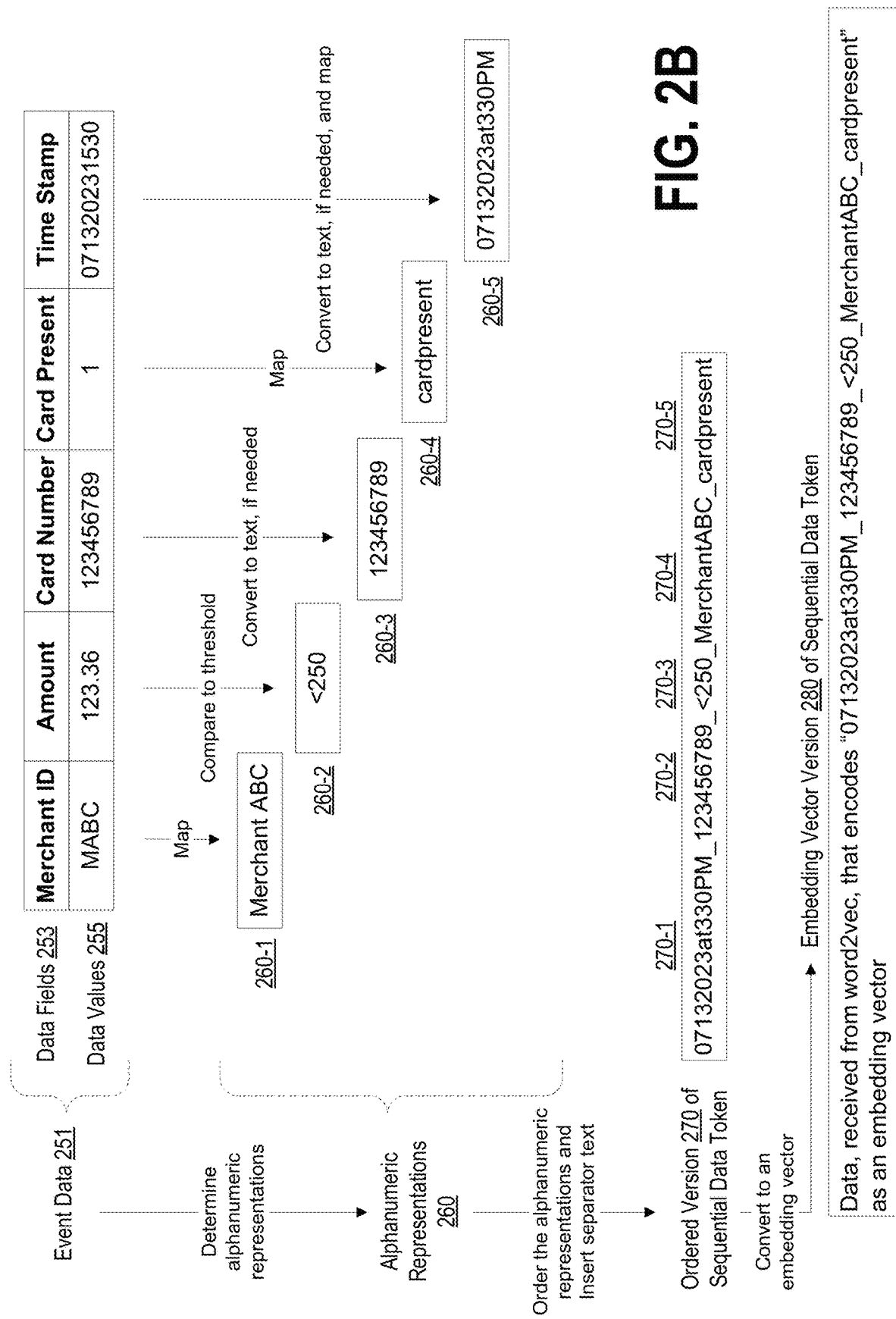
FIG. 2B depicts an example illustration of an alphanumeric transformation technique in accordance with various aspects described herein.

To further illustrate the various ways in which the one or more computing devices perform steps 203 and 205 of FIG. 2A, a visual example of determining one or more alphanumeric representations based on event data and determining a sequential data token based on the one or more alphanumeric representations is provided by FIG. 2B. Put another way, FIG. 2B depicts an example illustration of an alphanumeric transformation technique for a single event and provides additional details to the processes that may be performed at steps 203 and 205 of FIG. 2A.

As depicted in FIG. 2B, event data 251 includes five data values 255 for five data fields 253. Each of the data fields 253 is a particular type of data field (e.g., a "Merchant ID" data field, an "Amount" data field, a "Card Number" data field, a "Card Present" data field, and a "Time Stamp" data field). The event data 251 is for the single event of a credit card transaction. The first data field, for a merchant identifier of a merchant involved in the credit card transaction ("Merchant ID" data field in FIG. 2B), has a data value of MABC. The second data field, for an amount of the credit card transaction ("Amount" data field in FIG. 2B), has a data value of 123.36. The third data field, for a card number of the credit card involved in the credit card transaction ("Card Number" data field in FIG. 2B), has a data value of 123456789. The fourth data field, for an indication as to whether the card is physically present for the credit card transaction ("Card Present" data field in FIG. 2B), is a Boolean value of 1, which indicates the credit card is present. The fifth data field, for a time stamp at which the credit card transaction was initiated ("Time Stamp" data field in FIG. 2B), is 071320231530, which indicates the date (07132023 for a date of Jul. 13, 2023) and time (1530 is 3:30 PM) at which the credit card transaction was initiated. As depicted in FIG. 2B, this event data 251 is processed to determine alphanumeric representations of the five data values 255 and to determine a sequential data token based on the alphanumeric representations.

More fully, the event data 251 is first processed to determine alphanumeric representations 260 for each of the five data values 255. The various manners in which this determination is made was discussed above in connection with step 203 of FIG. 2A. FIG. 2B depicts one example way in which the alphanumeric representations 260 may be determined based on the event data 251. As depicted, the five data values 253 are respectively processed into alphanumeric representations 260-1 to 260-5. The first data value, MABC, is processed into alphanumeric representation 260-1, which has a value of "Merchant ABC". The second data value, 123.36, is processed into alphanumeric representation "<250". The third data value, 123456789, is processed into alphanumeric representation "123456789". The fourth data value, 1, is processed into alphanumeric representation "07132023at330PM".

The alphanumeric representations 260-1 to 260-5 are shown in a staggered fashion in FIG. 2B to indicate that each data value is processed separately from the other data values and may include processes that are specific to the type of data field. In this way, the first data value, MABC, is processed based on being for a "Merchant ID" data field by mapping MABC to an expanded form "Merchant ABC". The second data value, 123.36, is processed based on being for an "Amount" data field by comparing 123.36 to an amount threshold of 250 and indicating the result of the comparison, "<250", which is that 123.36 is less than the amount threshold of 250. The third data value, 123456789, may be converted to a text format, if needed, that indicates the same credit card number, "123456789". The fourth data value, 1, may be mapped to a text format, "cardpresent", to indicate that the card is present for the credit card transaction. The fifth data value, 071320231530, may be converted to a text format, if needed, and mapped to an expanded form, "07132023at330PM".

The alphanumeric representations 260 may then be processed into a sequential data token. The various manners in which this determination is made was discussed above in connection with step 205 of FIG. 2A. FIG. 2B depicts one example way in which a sequential data token may be determined based on the alphanumeric representations 260. As depicted in FIG. 2B, the alphanumeric representations 260-1 to 260-5 are placed in an order (e.g., based on predefined sequencing criteria) and separator text of "_" is inserted between each pair of alphanumeric representations 260-1 to 260-5. This results in an ordered version 270 of a sequential data token, "07132023at330PM_123456789_<250_ MerchantABC_cardpresent". With respect to the alphanumeric representations 260-1 to 260-5, the order of the alphanumeric representation 260-5 is in first place 270-1 in the ordered version 270 of the sequential data token. Alphanumeric representation 260-3 is in second place 270-2 in the ordered version 270 of the sequential data token. Alphanumeric representation 260-2 is in third place 270-3 in the ordered version 270 of the sequential data token. Alphanumeric representation 260-1 is in fourth place 270-4 in the ordered version 270 of the sequential data token. Alphanumeric representation 260-4 is in fifth place 270-5 in the ordered version 270 of the sequential data token.

As depicted in FIG. 2B, this ordered version 270 of the sequential data token undergoes further processing. Indeed, the ordered version 270 of the sequential data token is converted to an embedding vector (e.g., by using word2vec). This results in an embedding vector version 280 of the sequential data token. The embedding vector version 280 of the sequential data token includes data, received from word2vec, that encodes "07132023at330PM_123456789_<250_ MerchantABC_cardpresent" as an embedding vector.

The above example of FIG. 2B is with respect to the single event of a credit card transaction. The processing of different events based on an alphanumeric transformation technique may be performed in a similar manner as described in connection with FIG. 2B. In this way, the alphanumeric transformation technique, described in the above example of FIG. 2B, may be performed in a similar manner for various events including, for example, the single event of a bank account transaction or a single click stream event.

Additionally, the above example of FIG. 2B shows that event data may be processed in such a way that the resulting sequential data token includes data that is more than simply a natural language version of one or more data values of the single event. Indeed, as shown in FIG. 2B, the second data value, 123.36, is processed in such a way that the sequential data token includes "<250" based on the second data value (e.g., 123.36 was compared to an amount threshold and the result of that comparison is indicated by the sequential data token including "<250"). In this way, the above example of FIG. 2B shows that the event data may be processed based on one or more selected levels of granularity. In some variations, any or all of the data fields may be associated with their own selected level of granularity. Referring again to the above example of FIG. 2B and the second data value of 123,36, the selected level of granularity may be price ranges within $250. Based on this selected level of granularity, the second data value may be successively compared to one or more amount thresholds until it is determined that the second data value falls within a range of prices indicated by the one or more amount thresholds (e.g., $0 to $250, $250.01 to $500, $500.01 to $750, and so on). Based on the determination that the second data value falls within a range of prices, the sequential data token may indicate both the selected level of granularity for the amount data ("<250" indicates a selected level of granularity of $250) and a range of prices that the second data value falls within (e.g., "<250" indicates that the amount of the credit card transaction is within a range between $0 to $250). Additional examples of selected levels of granularity and additional ways in which the resulting sequential data token may include data that is more than simply a natural language version of one or more data values will be apparent based on the many additional examples discussed throughout this disclosure. As just two examples, FIGS. 6B and 7B provide additional examples of selected levels of granularity.

Having discussed the visual example depicted in FIG. 2B, the discussion of the example method 200 of FIG. 2A can continue. At step 207, the one or more computing devices may provide the sequential data token as input to a large language model. The large language model may be any one of the large language models 110 discussed above in connection with FIG. 1.

At step 209, the one or more computing devices may receive output from the large language model. This output may include generative text (e.g., sentences and/or paragraphs) based on the sequential data token.

At step 211, the one or more computing devices may send the output for use as input to one or more machine learning models associated with a classification task. The one or more machine learning models associated with the classification task may be any, or all, of the one or more machine learning models 160 discussed above in connection with FIG. 1. Additional details on how the output of the large language model may be used as input to the one or more machine learning models associated with the classification task will be discussed in connection with FIG. 9

The above example method 200 is with respect to a single event. In this way, any and all of the steps of example method 200 may be performed for the single event and not for a plurality of events. This relationship with a single event may continue when the classification task mentioned in connection with the example method 200 is performed. That is the classification task may also be performed for the single event.

Figure 3A:
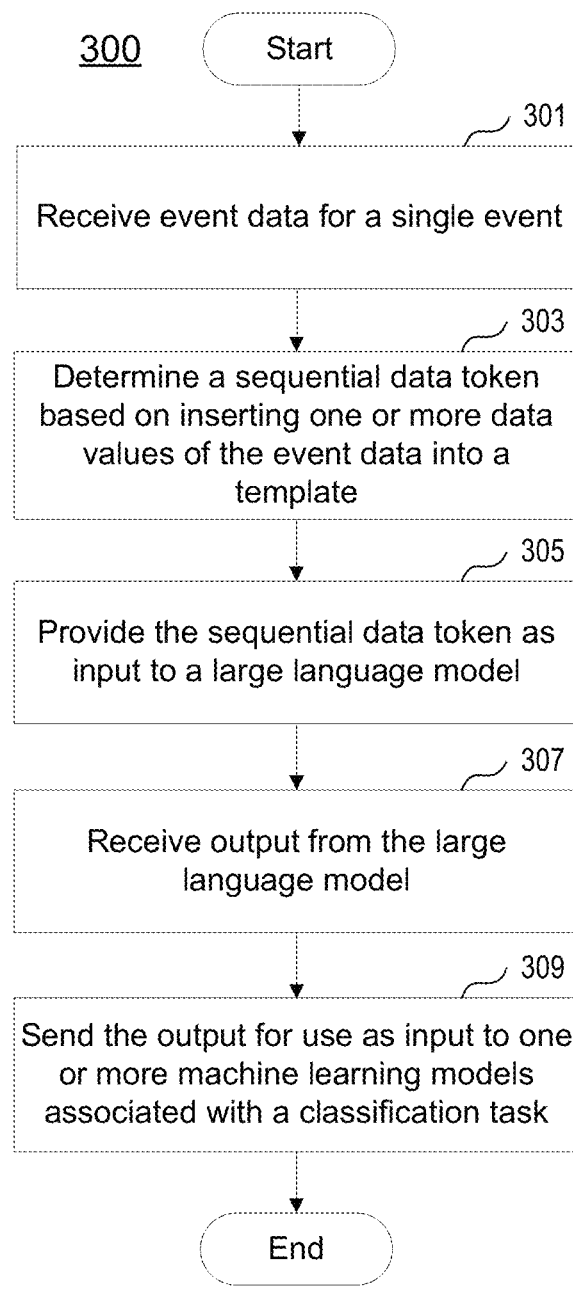
FIG. 3A depicts an example method that processes event data and/or tabular data based on a template technique in accordance with various aspects described herein.

FIG. 3A depicts an example method 300 that processes event data for a single event based on a template technique. Method 300 may be implemented in suitable computer-executable instructions and performed by one or more computing devices.

At step 301, the one or more computing devices may receive event data for a single event. The event data may be the same, or similar to, the event data discussed above in connection with step 201 of FIG. 2A. For example, the event data may include one or more data fields for the single event and each of the one or more data fields may have its own data value. Table I, presented above, provides some examples of the data fields and data values that may be included in event data.

At step 303, the one or more computing devices may determine a sequential data token based on inserting one or more data values of the event data into a template. The template may include words written in sentences and/or paragraphs, and may otherwise resemble natural language written by a human. In this way, a template may be interchangeably referred to as a natural language template. In some variations, the template includes text written by a human and includes one or more locations where a data value may be inserted. Further, the template may associate particular types of data fields with particular insertion locations within the template. In this way, the data values may be inserted into the template in a particular order. This may result in data values being in an order within the template that is different from the order of the event data. Such differences between the order of the data values in the template and the order of the data values in the event data may result in improving the quality of output from the large language model that will eventually receive the sequential data token.

Additionally, in some variations, the one or more data values may be processed prior to being inserted into the template. A data value may be expanded (e.g., expand a merchant identifier to an expanded form (e.g., expand a data value of MABC to "Merchant ABC"), reformatted to be in a more readable form (e.g., reformat a data value of 1367.98 to 1,367.98; reformat a data value of 03232023 to Mar. 23, 2023); and/or abbreviated to a shortened form (e.g., shorten a credit card number to just the last four digits). Such processes prior to being inserted into the template may include the same, or similar, transformations that were discussed above in connection with step 203 of FIG. 2A and/or in connection with FIG. 2B.

Figure 3B:
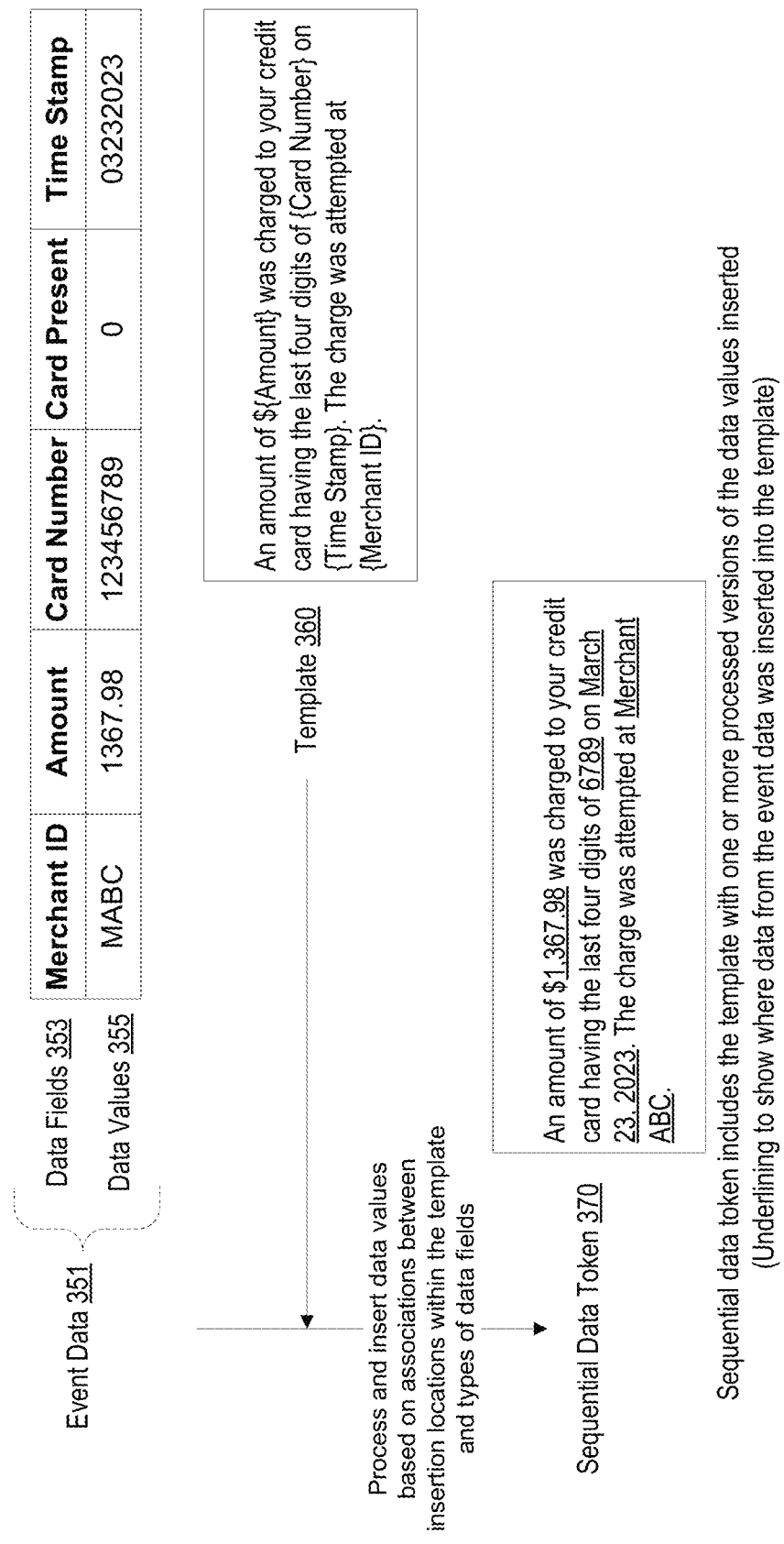
FIG. 3B depicts an example illustration of a template technique in accordance with various aspects described herein.

To further illustrate the various ways in which the one or more computing devices perform step 303 of FIG. 3A, a visual example of a sequential data token based on inserting one or more data values of the event data into a template is provided by FIG. 3B. Put another way, FIG. 3B depicts an example illustration of a template technique for a single event and provides additional details to the processes that may be performed at step 303 of FIG. 3A.

As depicted in FIG. 3B, event data 351 includes five data values 355 for five data fields 353. Each of the data fields 353 is a particular type of data field (e.g., a "Merchant ID" data field, an "Amount" data field, a "Card Number" data field, a "Card Present" data field, and a "Time Stamp" data field). The event data 351 is for the single event of a credit card transaction. The first data field, for a merchant identifier of a merchant involved in the credit card transaction ("Merchant ID" data field in FIG. 3B), has a data value of MABC. The second data field, for an amount of the credit card transaction ("Amount" data field in FIG. 2B), has a data value of 123.36. The third data field, for a card number of the credit card involved in the credit card transaction ("Card Number" data field in FIG. 2B), has a data value of 123456789. The fourth data field, for an indication as to whether the card is physically present for the credit card transaction ("Card Present" data field in FIG. 2B), is a Boolean value of 0, which indicates the credit card is not present. The fifth data field, for a time stamp at which the credit card transaction was initiated ("Time Stamp" data field in FIG. 2B), is 03232023, which indicates the date (03232023 for a date of Mar. 23, 2023) at which the credit card transaction was initiated. As depicted in FIG. 3B, this event data 351 is processed and inserted into a template 360 based on associations between insertion locations within the template and types of data fields.

These associations are shown in FIG. 3B by identifying the type of the data field within brackets {and} at the various insertion locations. The template 360 is depicted in FIG. 3B as including four insertion locations (via the brackets { and}). The first insertion location is associated with the "Amount" data field ("{Amount}" as shown in FIG. 3B). The second insertion location is associated with the "Card Number" data field ("{Card Number}" as shown in FIG. 3B). The third insertion location is associated with the "Time Stamp" data field ("{Time Stamp}" as shown in FIG. 3B). The fourth insertion location is associated with the "Merchant ID" data field ("{Merchant ID}" as shown in FIG. 3B).

Based on these associations between the four insertion locations and the types of data fields, four of the data values from event data 351 are processed for insertion into the template 360. One data value, 0 for the "Card Present" data field, is not processed and is not inserted because the template 360 does not include an association between an insertion location and the "Card Present" data field. Processed versions of the four data values are determined by this processing and the processed versions of the four data values are then inserted into the template 360 at the four insertion locations. This insertion is based on the associations of template 360. Once the insertion process is complete, the template 360 with the inserted values may be used as the sequential data token 370.

As depicted in FIG. 3B, the sequential data token 370 includes the template 360 with the processed versions of the four data values inserted into the template 360. FIG. 3B shows underlining where processed versions of the processed versions of the four data values have been inserted. As shown by the sequential data token 370, the amount of the credit card transaction (1367.98 in the "Amount" data field) has been reformatted to be in a more readable form (1,367.98 in the sequential data token 370) and the reformatted version has been inserted into the template in the first insertion location. The credit card number (123456789 in the "Card Number" data field) has been abbreviated to be only the last four digits (6789 in the sequential data token 370) and the abbreviated version has been inserted into the template in the second insertion location. The time stamp (03232023 in the "Time Stamp" data field) has been reformatted to be in a more readable form (Mar. 23, 2023 in the sequential data token 370). The merchant identifier (MABC in the "Merchant ID" data field) has been expanded into an expanded form (Merchant ABC in the sequential data token 370).

The above example of FIG. 3B is with respect to the single event of a credit card transaction. The processing of different events based on a template technique may be performed in a similar manner as described in connection with FIG. 3B. In this way, the template technique, described in the above example of FIG. 3B, may be performed in a similar manner for various events including, for example, the single event of a bank account transaction or a single click stream event.

Having discussed the visual example depicted in FIG. 3B, the discussion of the example method 300 of FIG. 3A can continue. At step 305, the one or more computing devices may provide the sequential data token as input to a large language model. The large language model may be any one of the large language models 110 discussed above in connection with FIG. 1.

At step 307, the one or more computing devices may receive output from the large language model. This output may include generative text (e.g., sentences and/or paragraphs) based on the sequential data token.

At step 309, the one or more computing devices may send the output for use as input to one or more machine learning models associated with a classification task. The one or more machine learning models associated with the classification task may be any, or all, of the one or more machine learning models 160 discussed above in connection with FIG. 1. Additional details on how the output of the large language model may be used as input to the one or more machine learning models associated with the classification task will be discussed in connection with FIG. 9

The above example method 300 is with respect to a single event. In this way, any and all of the steps of example method 300 may be performed for the single event and not for a plurality of events. This relationship with a single event may continue when the classification task mentioned in connection with the example method 300 is performed. That is the classification task may also be performed for the single event.

Figure 4A:
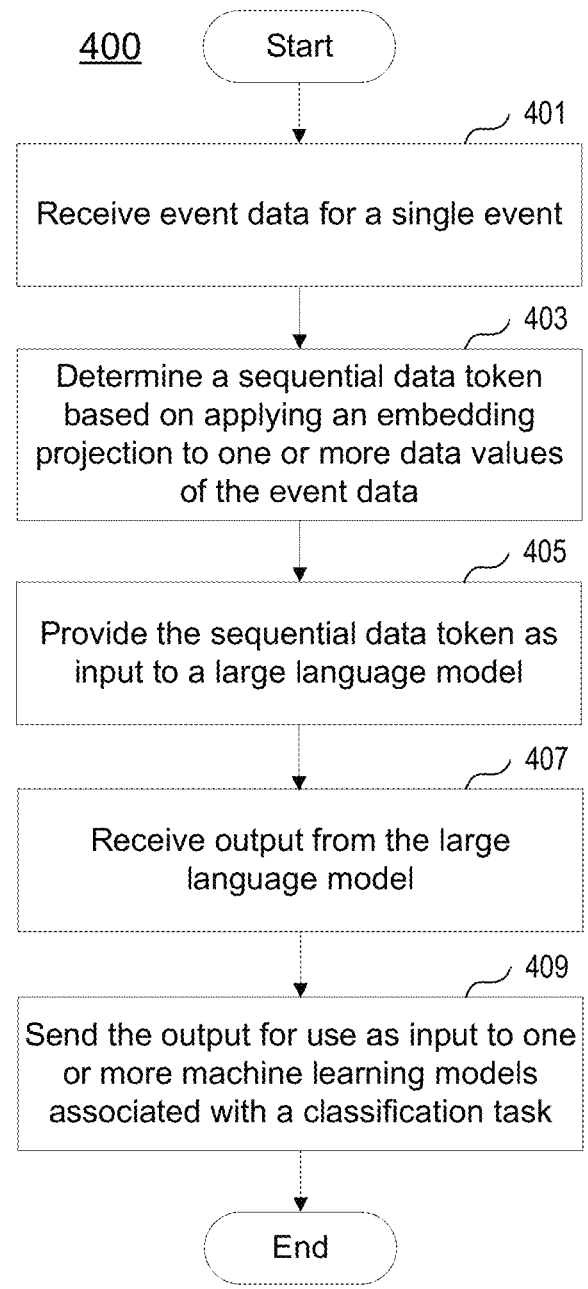
FIG. 4A depicts an example method that processes event data and/or tabular data based on an embedding projection technique in accordance with various aspects described herein.

FIG. 4A depicts an example method 400 that processes event data for a single event based on an embedding vector technique. Method 400 may be implemented in suitable computer-executable instructions and performed by one or more computing devices.

At step 401, the one or more computing devices may receive event data for a single event. The event data may be the same, or similar to, the event data discussed above in connection with step 201 of FIG. 2A. For example, the event data may include one or more data fields for the single event and each of the one or more data fields may have its own data value. Table I, presented above, provides some examples of the data fields and data values that may be included in event data.

At step 403, the one or more computing devices may determine a sequential data token based on applying an embedding projection to one or more data values of the event data. In general, the embedding projection may determine an embedding for each of the one or more data values and then combine the resulting embeddings together to form the sequential data token. The embedding projection may include transforming alphanumeric and/or text data values into a numeric form. This transformation may be performed based on an index lookup that maps alphanumeric and/or text values to numeric values, or some other algorithm that deterministically transforms alphanumeric and/or text values to a numeric value. The embedding projection may include projecting each of the one or more data values into a predetermined size or length for the embeddings. This predetermined size or length may be referred to as the embedding dimension (e.g., if the embedding is to have N dimensions, the one or more data values may be projected into N dimensions). The embedding projection may include combining the embeddings for the one or more data values in some fashion (e.g., by averaging the embeddings, by performing an attention technique on the embeddings, by performing a Fourier transformation on the embeddings, and the like).

In some variations, the embedding projection may be performed to the one or more data values so that the embeddings determined for the one or more data values are in a particular order. This order may impact the manner in which the embeddings are combined (e.g., embeddings earlier in the order may be given more weight than embeddings later in the order when combining the embeddings). Further, this order, and any impact the order has to the manner in which the embeddings are combined, may result in improving the quality of output from the large language model that will eventually receive the sequential data token.

Figure 4B:
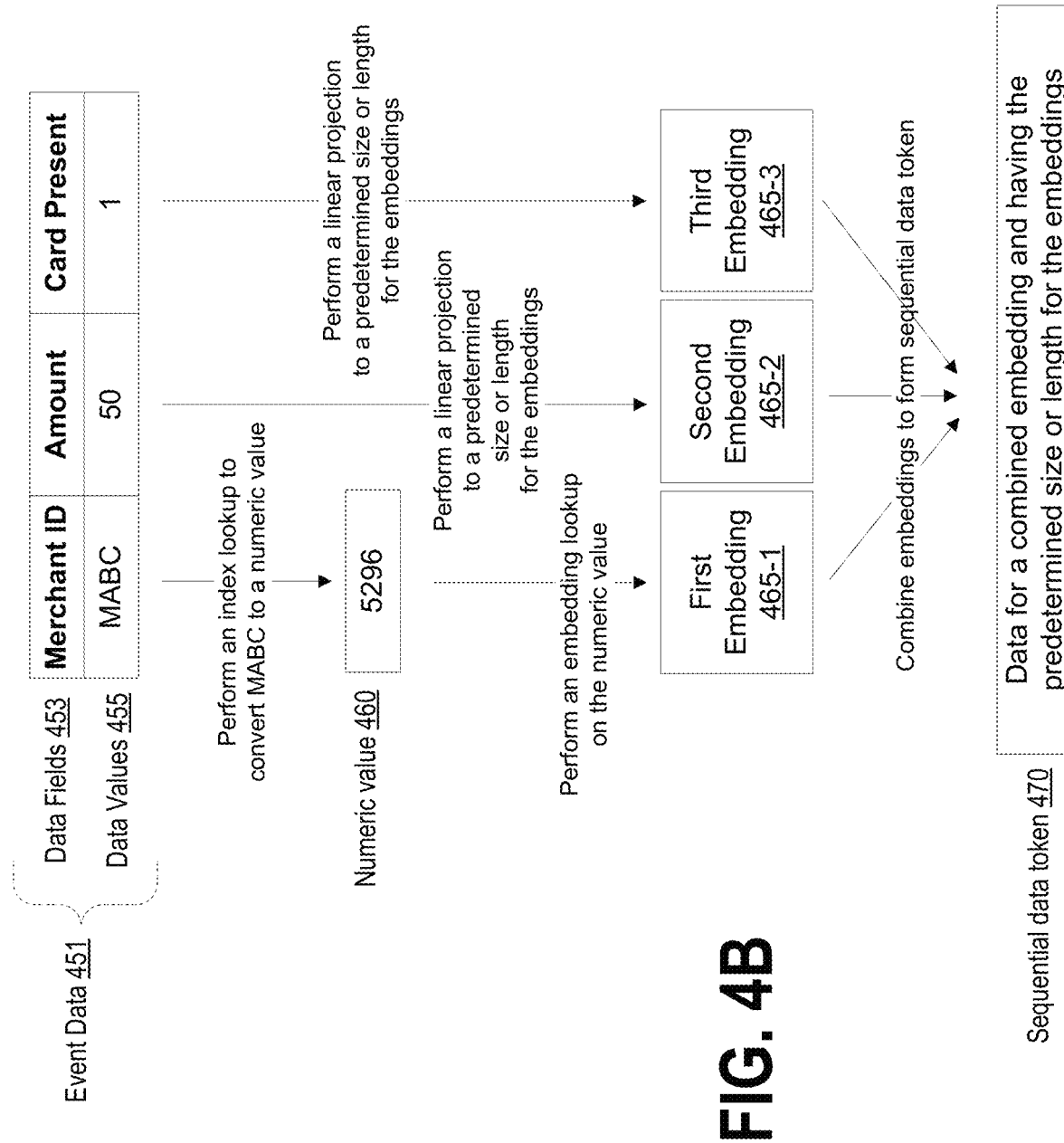
FIG. 4B depicts an example illustration of an embedding projection technique in accordance with various aspects described herein.

To further illustrate the various ways in which the one or more computing devices perform step 403 of FIG. 4A, a visual example of a sequential data token based on applying an embedding projection to one or more data values of the event data is provided by FIG. 4B. Put another way, FIG. 4B depicts an example illustration of an embedding projection technique for a single event and provides additional details to the processes that may be performed at step 403 of FIG. 4A.

As depicted in FIG. 4B, event data 451 includes three data values 455 for three data fields 453. Each of the data fields 353 is a particular type of data field (e.g., a "Merchant ID" data field, an "Amount" data field, and a "Card Present" data field). The event data 451 is for the single event of a credit card transaction. The first data field, for a merchant identifier of a merchant involved in the credit card transaction ("Merchant ID" data field in FIG. 3B), has a data value of MABC. The second data field, for an amount of the credit card transaction ("Amount" data field in FIG. 2B), has a data value of 50. The third data field, for an indication as to whether the card is physically present for the credit card transaction ("Card Present" data field in FIG. 2B), is a Boolean value of 1, which indicates the credit card is present. As depicted in FIG. 3B, this event data 451 is processed by applying an embedding projection that forms three embeddings based on the three data values 365-1 to 365-3 and combines the three embeddings into the sequential data token 370.

More fully, the first data value, MABC, is processed by the embedding projection to form a first embedding 465-1. This first embedding 465-1 is based on first performing an index lookup on the first data value, which converts the first data value to a numeric value 460. As depicted, the index lookup converts MABC to 5296. An embedding lookup is then performed on the numeric value 460, which converts the numeric value into an embedding of a predefined size or length for the embeddings. As depicted, the embedding looking converts 5296 to the first embedding 465-1. The second data value, 50, is processed by the embedding projection to form a second embedding 465-2. This second embedding 465-2 is based on performing a linear projection that projects the value of 50 to the predefined size or length of the embeddings. The third data value, 1, is processed by the embedding projection to form a third embedding 465-3. This third embedding 465-3 is based on performing a linear projection that projects the value of 1 to the predefined size or length of the embeddings.

The three embeddings 465-1 to 465-3 are then combined to form the sequential data token 470. The embedding projection may include combining the embeddings for the one or more data values in some fashion. As some examples, the three embeddings 465-1 to 465-3 may be combined based on an averaging of the three embeddings 465-1 to 465-3, The three embeddings 465-1 to 465-3 may be combined based on an attention technique. The three embeddings 465-1 to 465-3 may be combined based on a Fourier transformation. The three embeddings 465-1 to 465-3 may be combined by weighting the first embedding more than the third embedding based on the order of the three embeddings 465-1 to 465-3. As shown, once combined, the sequential data token 470 may include data for a combined embedding and the combined embedding may have the predetermined size or length for the embeddings.

The above example of FIG. 4B is with respect to the single event of a credit card transaction. The processing of different events based on an embedding projection technique may be performed in a similar manner as described in connection with FIG. 4B. In this way, the embedding projection technique, described in the above example of FIG. 4B, may be performed in a similar manner for various events including, for example, the single event of a bank account transaction or a single click stream event.

Having discussed the visual example depicted in FIG. 4B, the discussion of the example method 400 of FIG. 4A can continue. At step 405, the one or more computing devices may provide the sequential data token as input to a large language model. The large language model may be any one of the large language models 110 discussed above in connection with FIG. 1.

At step 407, the one or more computing devices may receive output from the large language model. This output may include generative text (e.g., sentences and/or paragraphs) based on the sequential data token.

At step 409, the one or more computing devices may send the output for use as input to one or more machine learning models associated with a classification task. The one or more machine learning models associated with the classification task may be any, or all, of the one or more machine learning models 160 discussed above in connection with FIG. 1. Additional details on how the output of the large language model may be used as input to the one or more machine learning models associated with the classification task will be discussed in connection with FIG. 9

The above example method 400 is with respect to a single event. In this way, any and all of the steps of example method 400 may be performed for the single event and not for a plurality of events. This relationship with a single event may continue when the classification task mentioned in connection with the example method 400 is performed. That is the classification task may also be performed for the single event.

Figure 5A:
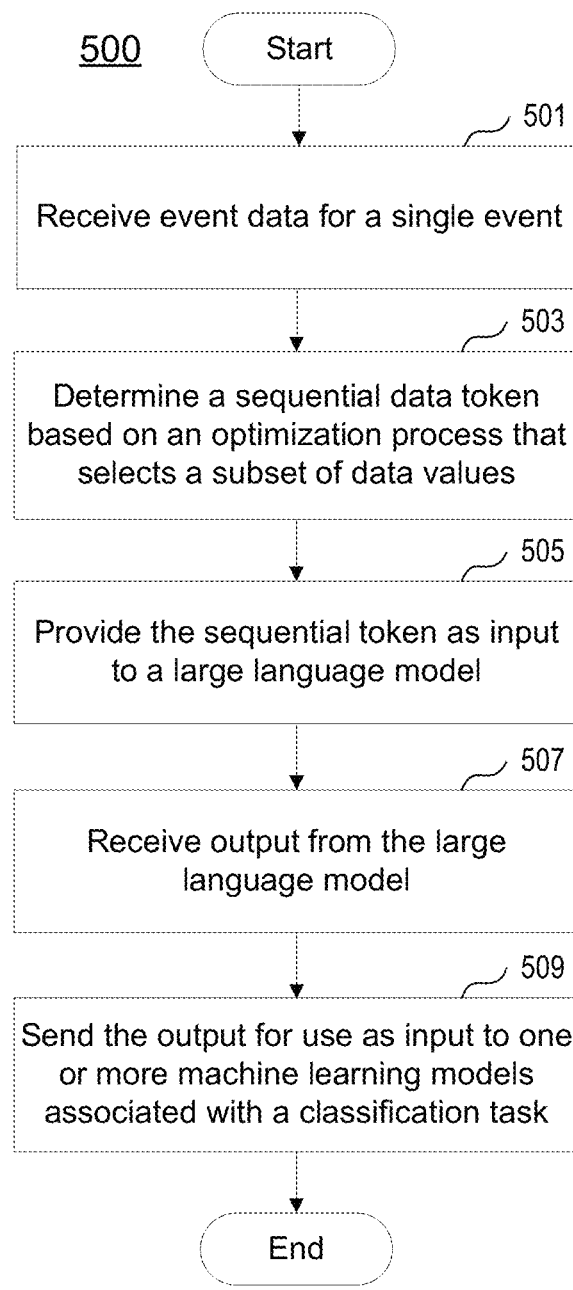
FIG. 5A depicts an example method that processes event data and/or tabular data based on an optimization technique in accordance with various aspects described herein.

FIG. 5A depicts an example method 500 that processes event data for a single event based on an optimization technique. Method 500 may be implemented in suitable computer-executable instructions and performed by one or more computing devices.

At step 501, the one or more computing devices may receive event data for a single event. The event data may be the same, or similar to, the event data discussed above in connection with step 201 of FIG. 2A. For example, the event data may include one or more data fields for the single event and each of the one or more data fields may have its own data value. Table I, presented above, provides some examples of the data fields and data values that may be included in event data.

At step 503, the one or more computing devices may determine a sequential data token based on an optimization process that selects a subset of data values. This optimization process may iterate until optimization criteria is satisfied. Based on the iterations, a determination will be made as to whether each data value will be included in the sequential data token. This iterative approach may be based on a Bayesian optimization loop that optimizes for criteria such as entropy, Gini coefficient, variance, and the like.

The optimization process may also optimize by order of the data values. In this way, the optimization process may, as compared to the order in which the data values appear in the event data, change the order in which the data values are placed in the sequential data token. Any changes made to the order in which the data values are placed in the sequential data token may result in improving the quality of output from the large language model that will eventually receive the sequential data token.

In some variations, the optimization process is performed as a configuration process that determines which subset of data values to include for each type of event. In this way, when the sequential data token is being determined based on an optimization process, the one or more computing devices may determine the type of the event (e.g., credit card transaction, account transaction, click stream event, and the like) based on the data fields included in the event data, access information that indicates the results of the optimization process that was performed as a configuration process, determine which subset of data fields to include in the sequential data token based on the results, and proceed to include that subset of data fields in the sequential data token.

Additionally, in some variations, any data value determined to be included in the sequential data token may be processed prior to being placed in the sequential data token. A data value may be expanded (e.g., expand a merchant identifier to an expanded form (e.g., expand a data value of MABC to "Merchant ABC"), reformatted to be in a more readable form (e.g., reformat a data value of 1367.98 to 1,367.98; reformat a data value of 03232023 to Mar. 23, 2023); and/or abbreviated to a shortened form (e.g., shorten a credit card number to just the last four digits). Such processes prior to being placed in the sequential data token may include the same, or similar, transformations that were discussed above in connection with step 203 of FIG. 2A.

Figure 5B:
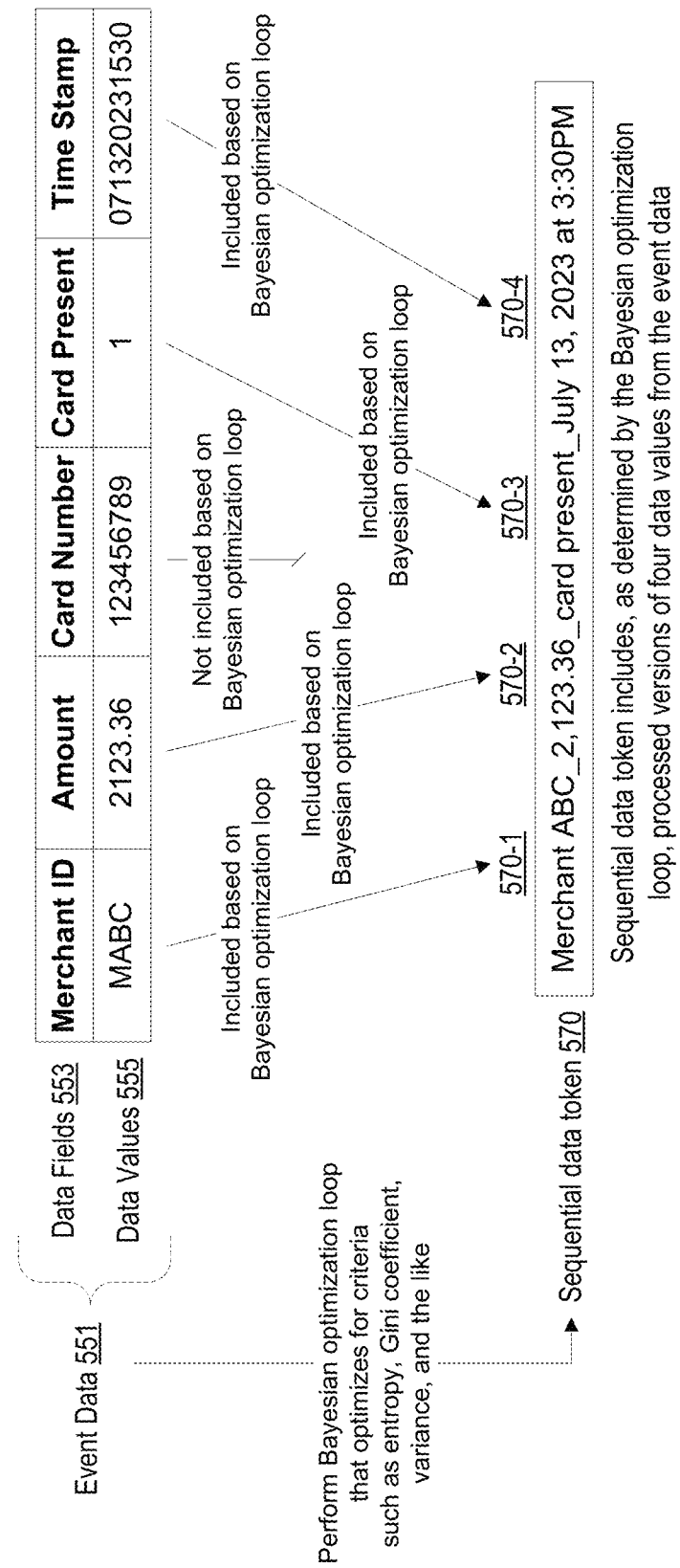
FIG. 5B depicts an example illustration of an optimization technique in accordance with various aspects described herein.

To further illustrate the various ways in which the one or more computing devices perform step 503 of FIG. 5A, a visual example of a sequential data token based on applying an optimization process that selects a subset of data values is provided by FIG. 5B. Put another way, FIG. 5B depicts an example illustration of an optimization technique for a single event and provides additional details to the processes that may be performed at step 503 of FIG. 5A.

As depicted in FIG. 5B, event data 551 includes five data values 555 for five data fields 553. Each of the data fields 553 is a particular type of data field (e.g., a "Merchant ID" data field, an "Amount" data field, a "Card Number" data field, a "Card Present" data field, and a "Time Stamp" data field). The event data 551 is for the single event of a credit card transaction. The first data field, for a merchant identifier of a merchant involved in the credit card transaction ("Merchant ID" data field in FIG. 5B), has a data value of MABC. The second data field, for an amount of the credit card transaction ("Amount" data field in FIG. 5B), has a data value of 2123.36. The third data field, for a card number of the credit card involved in the credit card transaction ("Card Number" data field in FIG. 5B), has a data value of 123456789. The fourth data field, for an indication as to whether the card is physically present for the credit card transaction ("Card Present" data field in FIG. 5B), is a Boolean value of 1, which indicates the credit card is present. The fifth data field, for a time stamp at which the credit card transaction was initiated ("Time Stamp" data field in FIG. 5B), is 071320231530, which indicates the date (07132023 for a date of Jul. 13, 2023) and time (1530 is 3:30 PM) at which the credit card transaction was initiated. As depicted in FIG. 5B, this event data 551 is processed based on performing a Bayesian optimization loop that optimizes for criteria such as entropy, Gini coefficient, variance, and the like.

As depicted in FIG. 5B, based on the Bayesian optimization loop, four of the data values from event data 551 are processed for inclusion by the sequential data token 570. One data value, 123456789 for the "Card Present" data field, was determined by the Bayesian optimization loop to not be included in the sequential data token 570 and, therefore, is not processed and is not included in the sequential data token 570. Processed versions of the four data values are determined by this processing and the processed versions of the four data values are then placed into the sequential data token 570.

As depicted in FIG. 5B, the sequential data token 570 includes, as determined by the Bayesian optimization loop, the processed versions of the four data values at 570-1 to 570-4. As shown at 570-1, the merchant identifier (MABC in the "Merchant ID" data field) has been expanded into an expanded form (Merchant ABC in the sequential data token 570). As shown at 570-2, the amount (2123.36 in the "Amount" data field) has been reformatted into a more readable form (2,123,36 in the sequential data token 570. As shown at 570-3, the Boolean value (1 in the "Card Present"

data field) has been reformatted into a more readable form ("card present" in the sequential data token 570. As shown at 570-4, the time stamp (071320231530 in the "Time Stamp" data field) has been reformatted to be in a more readable form (Jul. 13, 2023 at 3:30 PM in the sequential data token 570).

The above example of FIG. 5B is with respect to the single event of a credit card transaction. The processing of different events based on an optimization technique may be performed in a similar manner as described in connection with FIG. 5B. In this way, the optimization technique, described in the above example of FIG. 5B, may be performed in a similar manner for various events including, for example, the single event of a bank account transaction or a single click stream event.

Having discussed the visual example depicted in FIG. 5B, the discussion of the example method 500 of FIG. 5A can continue. At step 505, the one or more computing devices may provide the sequential data token as input to a large language model. The large language model may be any one of the large language models 110 discussed above in connection with FIG. 1.

At step 507, the one or more computing devices may receive output from the large language model. This output may include generative text (e.g., sentences and/or paragraphs) based on the sequential data token.

At step 509, the one or more computing devices may send the output for use as input to one or more machine learning models associated with a classification task. The one or more machine learning models associated with the classification task may be any, or all, of the one or more machine learning models 160 discussed above in connection with FIG. 1. Additional details on how the output of the large language model may be used as input to the one or more machine learning models associated with the classification task will be discussed in connection with FIG. 9

The above example method 500 is with respect to a single event. In this way, any and all of the steps of example method 500 may be performed for the single event and not for a plurality of events. This relationship with a single event may continue when the classification task mentioned in connection with the example method 500 is performed. That is the classification task may also be performed for the single event.

Figure 6A:
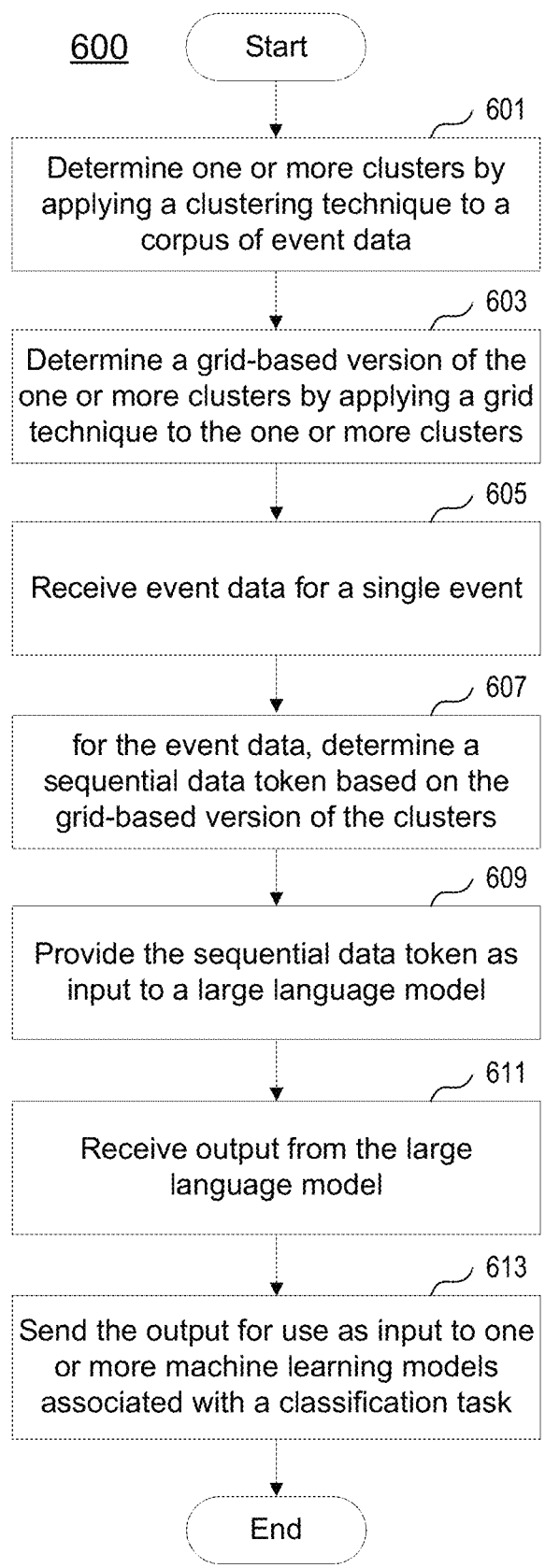
FIG. 6A depicts an example method that processes event data and/or tabular data based on both a clustering technique and a grid technique in accordance with various aspects described herein.
Figure 6B:
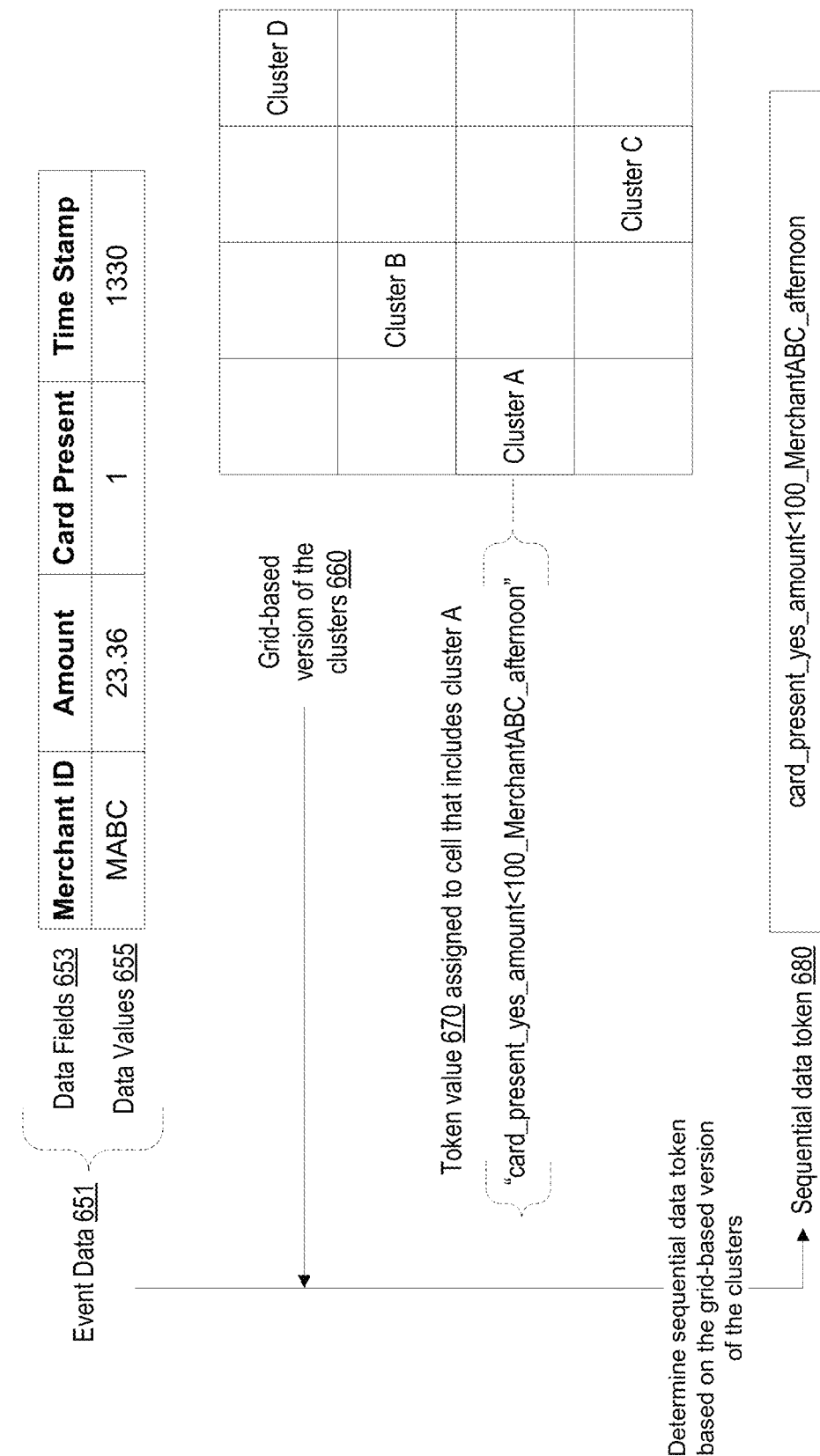
FIG. 6B depicts an example illustration of both a clustering technique and a grid technique in accordance with various aspects described herein.

FIG. 6A depicts an example method 600 that processes event data for a single event based on both a clustering technique and a grid technique. Method 600 may be implemented in suitable computer-executable instructions and performed by one or more computing devices.

At step 601, the one or more computing devices may determine one or more clusters by applying a clustering technique to a corpus of event data. The corpus of event data may be collected from various streams of event data and may include a large collection of events that occurred over a period of time (e.g., all the credit card transactions, account transactions, and click stream events that occurred over months and/or years). The clustering technique may be applied to the corpus of event data based on a pre-determined a vocabulary size for the clustering technique. The pre-determined vocabulary size may indicate how many clusters will be determined for the corpus of event data. The clustering technique may be applied to the corpus of event data based on a pre-determined distance metric (e.g., Euclidean, Manhattan, Correlation, Eisen, and the like). The clustering technique may be any type of clustering technique including centroid-based clustering, density-based clustering, distribution-based clustering, hierarchical clustering, non-hierarchical clustering, and the like. In some variations, the clustering technique is K-means.

At step 603, the one or more computing devices may determine a grid-based version of the one or more clusters by applying a grid technique to the one or more clusters. The grid technique may be based on a grid of cells configured to translate the clusters into a plurality of token values. The grid-based version of the clusters may include a grid of cells and each cell of the grid may be assigned a token value. Put another way, the plurality of token values may be assigned to the grid of cells and each cell may be assigned its own token value from the plurality of token values. The plurality of token values may each include text that indicates information about the event data according to a selected level of granularity.

The number of cells included by the grid of cells and the number of token values in the plurality of token values may depend on the potential values of event data and the selected level of granularity for the grid of cells. For example, an amount of a credit card transaction can be for a wide range of values. To encompass this wide range of values, the number of cells included by the grid of cells may need to increase as compared to a type of data field that has a narrow range of values. One type of data field that has a narrow range of values is the card present data field (e.g., a Boolean value of 0 or 1), which is discussed above in connection with Table I. However, if the level of granularity is selected such that a token value indicates a range for an amount of a credit card transaction (e.g., an amount less than $100, an amount between $100 and $1000, an amount between $1000 and $10000, and the like), the number of cells included by the grid of cells may decrease in view of the selected level of granularity.

To determine the grid-based version of the one or more clusters, the grid technique may assign the grid of cells to the clusters. By assigning the grid of cells to the clusters, the clusters may be associated with various token values in the plurality of token values. This assignment of the grid of cells to the clusters may be performed in such a way that each cluster is assigned its own cell. If that is not possible, this assignment of the grid of cells to the clusters may be performed in such a way that minimizes the number of clusters that share a cell. In general, a first of the clusters may be assigned to one cell of the grid of cells and that first cluster may be translated to a first token value that is also assigned to that cell. Similarly, a second of the clusters may be assigned to a second token value that is also assigned to that cell. The first token value may differ from the second token value and, therefore, different clusters may be translated to different token values.

At step 605, the one or more computing devices may receive event data for a single event. The event data may be the same, or similar to, the event data discussed above in connection with step 201 of FIG. 2A. For example, the event data may include one or more data fields for the single event and each of the one or more data fields may have its own data value. Table I, presented above, provides some examples of the data fields and data values that may be included in event data.

At step 607, the one or more computing devices may, for the event data received at step 605, determine a sequential data token based on the grid-based version of the clusters. This determination may include rounding numerical features based on the selected level of granularity for the grid of cells. This determination may include determining which of the clusters the one or more data values of the event data belongs to. This determination may include determining which cell the one or more data values of the event data belongs to. This determination may include identifying which token value is assigned to the cell or cluster the one or more data values of the event data belongs to.

Additionally, in some variations, the plurality of token values may place its information in a particular order. In this way, the order in which the plurality of token values presents its information may be different from the order in which data values appear in the event data. Such differences between the order in which the information is presented in the plurality of token values and the order in which data values appear in the event data may result in improving the quality of output from the large language model that will eventually receive the sequential data token as input.

To further illustrate the various ways in which the one or more computing devices perform steps 601, 603, and 607 of FIG. 6A, a visual example of a sequential token based on a grid-based version of the clusters is provided by FIG. 6B. Put another way, FIG. 6B depicts an example illustration of both a clustering technique and a grid technique for a single event and provides additional details to the processes that may be performed by the example method 600 of FIG. 6A.

As depicted in FIG. 6B, event data 651 includes four data values 655 for four data fields 653. Each of the data fields 653 is a particular type of data field (e.g., a "Merchant ID" data field, an "Amount" data field, a "Card Present" data field, and a "Time Stamp" data field). The event data 551 is for the single event of a credit card transaction. The first data field, for a merchant identifier of a merchant involved in the credit card transaction ("Merchant ID" data field in FIG. 6B), has a data value of MABC. The second data field, for an amount of the credit card transaction ("Amount" data field in FIG. 6B), has a data value of 23.36. The third data field, for an indication as to whether the card is physically present for the credit card transaction ("Card Present" data field in FIG. 6B), is a Boolean value of 1, which indicates the credit card is present. The fourth data field, for a time stamp at which the credit card transaction was initiated ("Time Stamp" data field in FIG. 5B), is 1330, which indicates the time (1330 is 1:30 PM) at which the credit card transaction was initiated. As depicted in FIG. 6B, this event data 651 is processed based on a grid-based version of the clusters 660.

As depicted, the grid-based version of the clusters 660 includes a simplified example of a grid of cells, clusters, and token values assigned to the grid of cells. More fully, the grid-based version of the clusters includes 16 cells organized into rows and columns. Cluster A is within the first cell of the third row in the grid. Cluster B is within the second cell of the second row in the grid. Cluster C is within the third cell of the fourth row in the grid. Cluster D is within the fourth cell of the first row in the grid. Each cell of the grid may be assigned its own token value. As shown the cell that includes Cluster A is assigned token value 670, "card_present_yes_amount<100_MerchantABC_afternoon". Event data that has data values that are within the cell that includes Cluster A and/or are within Cluster A may be assigned token value 670 based on the grid-based version of the clusters 660.

Based on the grid-based version of the clusters 660 and the four data values 655 of the event data 651, the sequential data token 680 may be determined in a manner similar to that discussed above in connection with step 607 of FIG. 6A. For example, it may be determined that the four data values 655 are within the cell that includes Cluster A and/or are within Cluster A. Based on this determination, the token value 670 may be included in the sequential data token 680.

The sequential data token 680 indicates certain information about the event data based on the token value 670. For example, based on the text "card_present_yes", the sequential data token 680 indicates that the card is present for the credit card transaction. Based on the text "amount<100", the sequential data token 680 indicates that the amount of the credit card transaction is less than $100. Based on the text "MerchantABC", the sequential data token 680 indicates a merchant identifier for the merchant involved in the credit card transaction. Based on the text "afternoon", the sequential data token 680 indicates that the credit card transaction was initiated in the afternoon.

Additionally, the example of FIG. 6B again shows how a sequential data token may include data that indicates a selected level of granularity. As depicted in FIG. 6B, the sequential data token 680 includes the text "amount<100". This text indicates that the selected level or granularity is based on $100 and further indicates that the amount of the credit card transaction is within a range of 0 to $100.

The above example of FIG. 6B is with respect to the single event of a credit card transaction. The processing of different events based on a clustering and/or a grid technique may be performed in a similar manner as described in connection with FIG. 6B. In this way, the clustering technique and/or the grid technique, described in the above example of FIG. 6B, may be performed in a similar manner for various events including, for example, the single event of a bank account transaction or a single click stream event.

Having discussed the visual example depicted in FIG. 6B, the discussion of the example method 600 of FIG. 6A can continue. At step 609, the one or more computing devices may provide the sequential data token as input to a large language model. The large language model may be any one of the large language models 110 discussed above in connection with FIG. 1.

At step 611, the one or more computing devices may receive output from the large language model. This output may include generative text (e.g., sentences and/or paragraphs) based on the sequential data token.

At step 613, the one or more computing devices may send the output for use as input to one or more machine learning models associated with a classification task. The one or more machine learning models associated with the classification task may be any, or all, of the one or more machine learning models 160 discussed above in connection with FIG. 1. Additional details on how the output of the large language model may be used as input to the one or more machine learning models associated with the classification task will be discussed in connection with FIG. 9.

The above example method 600 is with respect to a single event. In this way, any and all of the steps of example method 600 may be performed for the single event and not for a plurality of events. This relationship with a single event may continue when the classification task mentioned in connection with the example method 600 is performed. That is the classification task may also be performed for the single event.

Figure 7A:
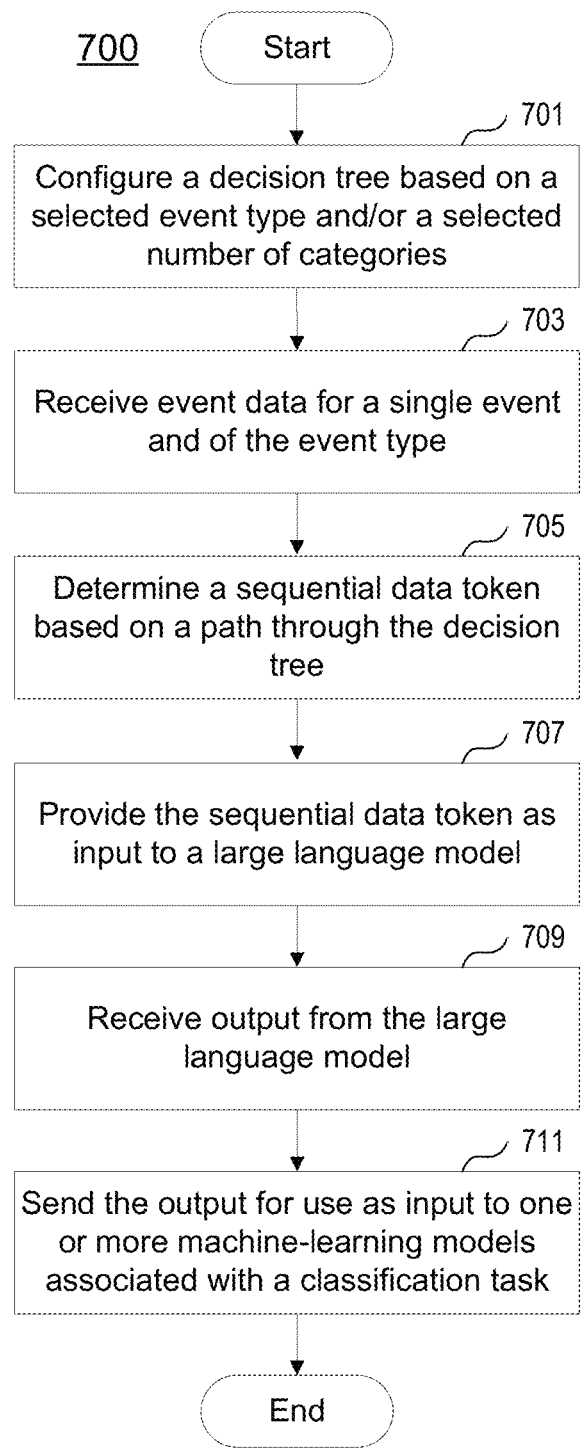
FIG. 7A depicts an example method that processes event data and/or tabular data based on a decision tree technique in accordance with various aspects described herein.
Figure 7B:
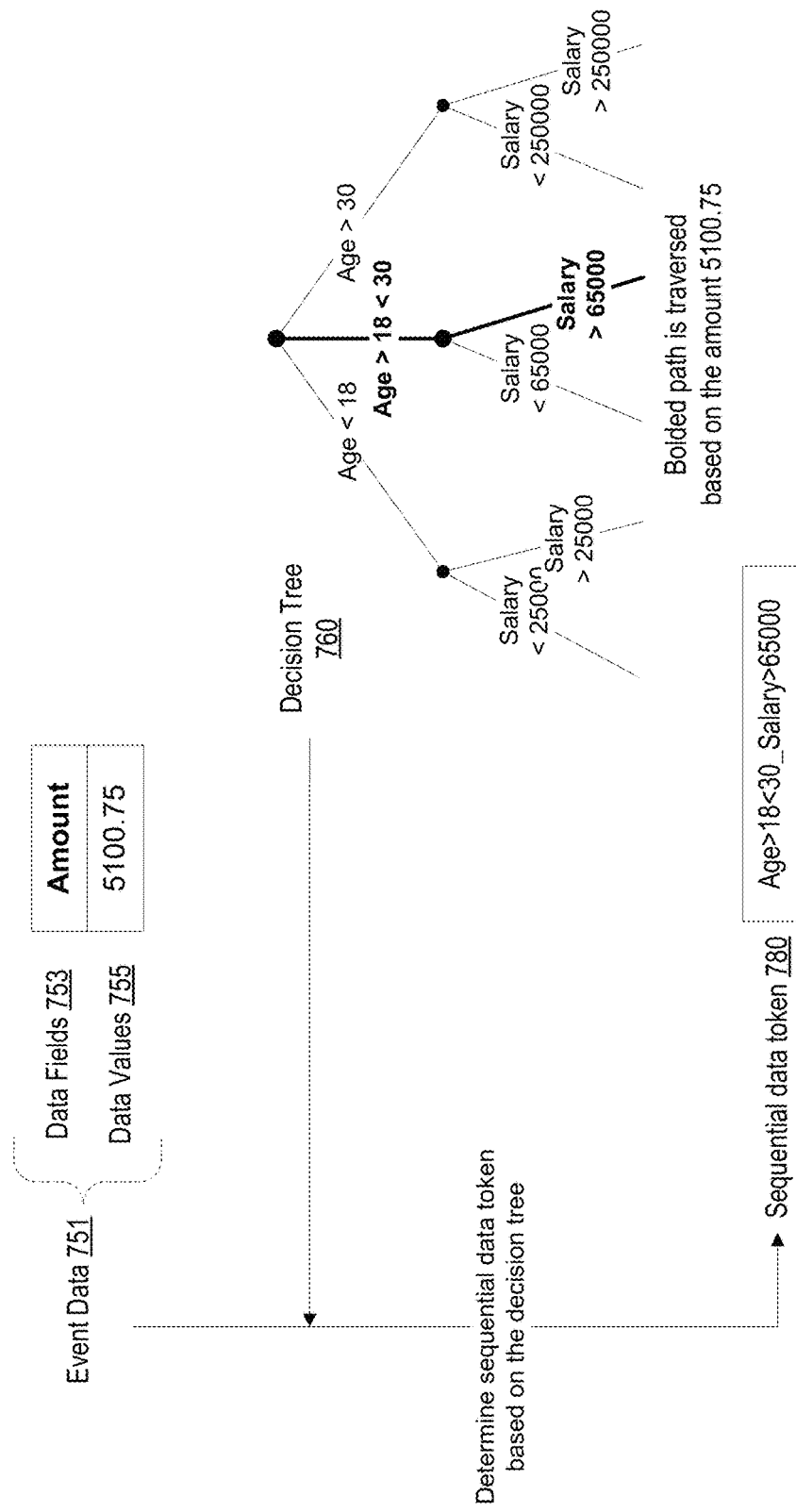
FIG. 7B depicts an example illustration of a decision tree technique in accordance with various aspects described herein.

FIG. 7A depicts an example method 700 that processes event data for a single event based on a decision tree technique. Method 700 may be implemented in suitable computer-executable instructions and performed by one or more computing devices.

At step 701, the one or more computing devices may configure a decision tree based on a selected event type and/or a selected number of categories. The decision tree may be configured for a selected event type (e.g., a credit card transaction). In this way, different event types. The decision tree may be configured based on a selected number of categories such that different paths are configured for the different combinations of the categories. Put another way, each level of the decision tree may correspond to a particular category type. Therefore, by traversing the decision tree, the traversed path may indicate a combination of categories specific to that path. Further, the combination of categories indicated by that traversed path may include a category for each category type (e.g., when traversing, each level of the tree may be visited once). The decision tree may be traversed based on decision points (or decision nodes). Each decision point may be associated with particular ranges, or combinations, of data values, and these associations may allow the various paths to be traversed based on one or more data values of event data. Accordingly, after being configured, the decision tree may include a plurality of paths through the decision tree. Each of the plurality of paths may be indicated by a combination of the categories for the path. Further, each decision point of the decision tree may associate a particular range, or combination, of data values that determine the way the decision tree is to be traversed based on one or more data values of event data.

Additionally, in some variations, the decision tree may be configured to establish the levels of the decision tree in a particular order. Such configuration may result in improving the quality of output from the large language model that will eventually receive the sequential data token as input.

At step 703, the one or more computing devices may receive event data for a single event and of the event type (e.g., event data for a single credit card transaction). The event data may be the same, or similar to, the event data discussed above in connection with step 201 of FIG. 2A. For example, the event data may include one or more data fields for the single event and each of the one or more data fields may have its own data value. Table I, presented above, provides some examples of the data fields and data values that may be included in event data.

At step 705, the one or more computing devices may determine a sequential data token based on a path through the decision tree. This determination may be performed by traversing the decision tree based on the decision points of the decision tree and one or more data values of the event data. In particular, the one or more data values of the event data will cause a particular path through the decision tree to be traversed. The sequential data token may include an indication of the combination of categories indicated for that particular path.

To further illustrate the various ways in which the one or more computing devices perform steps 701 and 705 of FIG. 7A, a visual example of a sequential token based on a decision tree is provided by FIG. 7B. Put another way, FIG. 7B depicts an example illustration of a decision tree technique for a single event and provides additional details to the processes that may be performed by the example method 700 of FIG. 7A.

As depicted in FIG. 7B, event data 751 includes a single data field 753. The single data field 753 is a particular type of data field (e.g., an "Amount" data field). The event data 751 is for the single event of a credit card transaction. The first data field, for an amount of the credit card transaction ("Amount" data field in FIG. 6B), has a data value of 5100.75. As depicted in FIG. 6B, this event data 651 is processed based on a decision tree 760.

As depicted, the decision tree 760 includes a simplified example with two types of categories: an age type of category and a salary type of category. The various categories are shown on the path segments of the decision tree that lead to a decision point (represented by filled in circles in FIG. 7B) 00 or the end of the decision tree 760. One or more ranges for an amount of a credit card transaction is associated at every decision point along the decision tree 760. In this way, the decision tree will be traversed based on what range the amount of a credit card transaction falls within. If the amount of the credit card transaction is sufficiently low (e.g., $10), the left-most path of the decision tree may be traversed (e.g., indicating a combination of categories that includes an age less than 18 and a salary less than $25,000). If the amount of the credit card transaction is sufficiently high (e.g., $10,000), the right-most path of the decision tree may be traversed (e.g., indicating a combination of categories that includes an age less than 18 and a salary more than $250,000). The other paths may be traversed based on other amounts of credit card transactions.

Based on the decision tree 760 and the single data value 755 of the event data 751, the sequential data token 780 may be determined in a manner similar to that discussed above in connection with step 705 of FIG. 7A. Based on the amount of 5100,75, one of the middle paths through the tree is traversed. As seen by the decision tree 760, this middle path that is traversed for the amount of 5100.75 is shown in bold. The path is traversed based on comparing the amount 5100.75 to the ranges associated with any decision point reached as the decision tree 760 is being traversed. Accordingly, based on the decision tree 760 and the single data value 755, the sequential data token 780 is shown as including "Age>18<30_Salary>65000" (e.g., indicating a combination of categories that includes an age between 18 and 30 and a salary greater than 65000).

Additionally, the example of FIG. 7B again shows how a sequential data token may include data that indicates a selected level of granularity. As depicted in FIG. 7B, the sequential data token 780 is shown as including "Age>18<30_Salary>65000". This shows two examples of selected levels of granularity, one selected level of granularity for the age category and a second selected level of granularity for the salary category. In this way, the sequential data token 780 indicates both the selected level of granularity for the age category and the selected level of granularity for the salary category.

The above example of FIG. 7B is with respect to the single event of a credit card transaction. The processing of different events based on decision tree technique may be performed in a similar manner as described in connection with FIG. 7B. In this way, the decision tree technique, described in the above example of FIG. 7B, may be performed in a similar manner for various events including, for example, the single event of a bank account transaction or a single click stream event.

Having discussed the visual example depicted in FIG. 7B, the discussion of the example method 700 of FIG. 7A can continue. At step 707, the one or more computing devices may provide the sequential data token as input to a large language model. The large language model may be any one of the large language models 110 discussed above in connection with FIG. 1.

At step 709, the one or more computing devices may receive output from the large language model. This output may include generative text (e.g., sentences and/or paragraphs) based on the sequential data token.

At step 711, the one or more computing devices may send the output for use as input to one or more machine learning models associated with a classification task. The one or more machine learning models associated with the classification task may be any, or all, of the one or more machine learning models 160 discussed above in connection with FIG. 1. Additional details on how the output of the large language model may be used as input to the one or more machine learning models associated with the classification task will be discussed in connection with FIG. 9.

The above example method 700 is with respect to a single event. In this way, any and all of the steps of example method 700 may be performed for the single event and not for a plurality of events. This relationship with a single event may continue when the classification task mentioned in connection with the example method 700 is performed. That is the classification task may also be performed for the single event.

Figure 8:
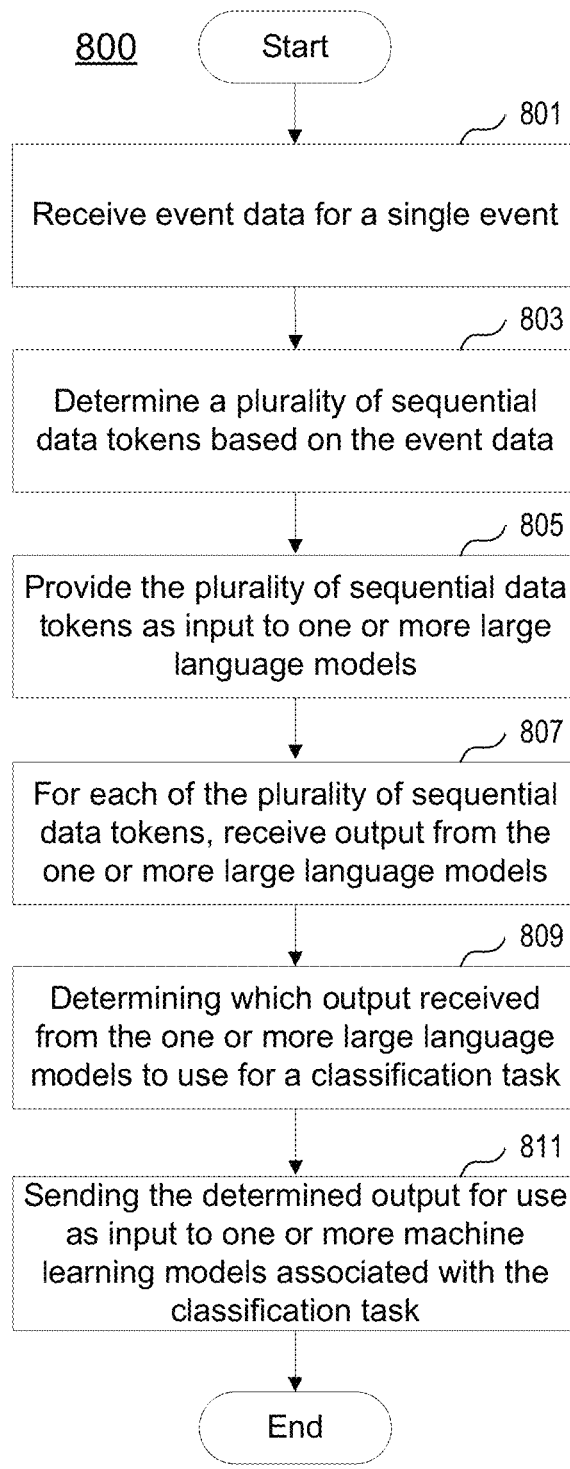
FIG. 8 depicts an example method that processes event data and/or tabular data based on a plurality of techniques in accordance with various aspects described herein.
Figure 9:
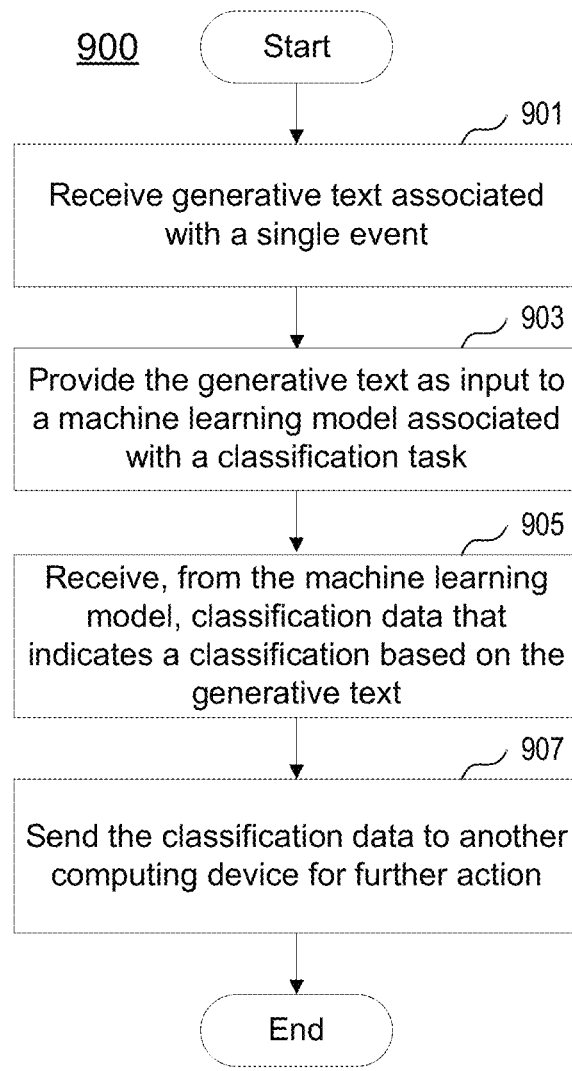
FIG. 9 depicts an example method that performs a classification task in accordance with various aspects described herein.

FIG. 8 depicts an example method 800 that processes event data for a single event based on a plurality of techniques including the different techniques discussed in connection with FIGS. 2A, 3A, 4A, 5A, 6A, and 7A. Method 800 may be implemented in suitable computer-executable instructions and performed by one or more computing devices.

At step 801, the one or more computing devices may receive event data for a single event. The event data may be the same, or similar to, the event data discussed above in connection with step 201 of FIG. 2A. For example, the event data may include one or more data fields for the single event and each of the one or more data fields may have its own data value. Table I, presented above, provides some examples of the data fields and data values that may be included in event data.

At step 803, the one or more computing devices may determine a plurality of sequential data tokens based on the event data. This determination may include performing any combination of the various techniques described in connection with FIGS. 2A, 3A, 4A, 5A, 6A, and 7A. Indeed, the following may be performed in any combination for the event data: the alphanumeric transformation technique of FIG. 2A, the template technique of FIG. 3A, the embedding projection technique of FIG. 4A, the optimization technique of FIG. 5A, both the clustering technique and grid technique of FIG. 7A, and the decision tree technique of FIG. 7A. More particularly, the steps of FIGS. 2A, 3A, 4A, 5A, 6A, and 7A may be performed in any combination for the event data: steps 203 and 205 of FIG. 2A; step 303 of FIG. 3A; step 403 of FIG. 4A; step 503 of FIG. 5A; steps 601, 603 and 607 of FIG. 6A; and steps 701 and 705 of FIG. 7A. In this way, the plurality of sequential data tokens may include tokens for the event data that were determined based on any combination of techniques described herein.

At step 805, the one or more computing devices may provide the plurality of sequential data tokens as input to one or more large language models. The one or more large language models may be any the large language models 110 discussed above in connection with FIG. 1.

At step 807, the one or more computing devices may, for each of the plurality of sequential data tokens, receive output from the one or more large language models. This output may include generative text (e.g., sentences and/or paragraphs) based on one of the plurality of sequential data tokens. Put another way, the one or more computing devices may receive generative text (e.g., included as output from the one or more large language models) for each of the plurality of sequential data tokens.

At step 809, the one or more computing devices may determine which output received from the one or more large language models to use for a classification task. This determination may be performed by evaluating, ranking, or scoring the output received from the one or more large language models for the plurality of sequential data tokens. Based on the evaluation, ranking, or scoring, an output for one of the plurality of sequential data tokens may be determined to use for a classification task. In some variations, the output used for the classification task is the one that evaluates to the highest quality, has the highest rank, or scores the highest.

At step 811, the one or more computing devices may send the output for use as input to one or more machine learning models associated with the classification task. The one or more machine learning models associated with the classification task may be any, or all, of the one or more machine learning models 160 discussed above in connection with FIG. 1. Additional details on how the output of the large language model may be used as input to the one or more machine learning models associated with the classification task will be discussed in connection with FIG. 9.

The above example method 800 is with respect to a single event. In this way, any and all of the steps of example method 800 may be performed for the single event and not for a plurality of events. This relationship with a single event may continue when the classification task mentioned in connection with the example method 800 is performed. That is the classification task may also be performed for the single event.

FIG. 9 depicts an example method 900 that performs a classification task for a single event and may be performed following any one, or any combination of, FIGS. 2A, 3A, 4A, 5A, 6A, 7A, and 8. Method 900 may be implemented in suitable computer-executable instructions and performed by one or more computing devices.

At step 901, the one or more computing devices may receive generative text associated with a single event. This generative text may be the output that was provided for use as input to one or more machine learning models, as discussed in connection with FIGS. 2A, 3A, 4A, 5A, 6A, 7A, and 8.

At step 903, the one or more computing devices may provide the generative text as input to a machine learning model associated with a classification task. The machine learning model may be one of the one or more machine learning models 160 discussed above in connection with FIG. 1. The classification task may be any type of classification task discussed in connection with FIG. 1.

At step 905, the one or more computing devices may receive, from the machine learning model, classification data that indicates a classification based on the generative text. The classification data may indicate, for example, a classification of the generative text as a way to determine whether fraud is detected (e.g., text that indicates whether fraud is detected based on the generative text); a classification of the generative text as a way to determine credit card recommendations (e.g., text that indicates one or more credit card recommendations); a classification of the generative text as a way to determine advertisement recommendations (e.g., text that indicates one or more advertisement recommendations); a classification of the generative text as a way to determine whether to accept or reject a credit card application (e.g., text that indicates whether to accept or reject a credit card application); and the like. This classification data may take the form of additional generative text, which was generated by the machine learning model.

At step 907, the one or more computing devices may send the classification data to another computing device for further action. The further action may depend on the classification task and/or the classification data. For example, based on text that indicates fraud is detected, a user of an account may be notified of the detected fraud. Based on text that indicates one or more credit card recommendations, a user may be notified of the credit card recommendation. Based on text that indicates one or more advertisement recommendations, a user may be presented with the recommended advertisements. Based on text that indicates to accept or reject a credit card application, the user's credit card application may be accepted or rejected.

The above examples of FIGS. 2A, 2B, 3A, 3B, 3C, 4A, 4B, 5A, 5B, 6A, 6B, 7A, 7B, 8, and 9 include only some example steps that may be performed to process event data, use a large language model based on the event data, and perform a classification task based on the event data. Some variations may perform additional and/or alternative steps. As a particular example, the above examples of FIGS. 2A, 2B, 3A, 3B, 3C, 4A, 4B, 5A, 5B, 6A, 6B, 7A, 7B, and 8 are with respect to receiving event data for a single event. As mentioned above, this is to further show how the flow of event data for a single event differs from arrangements that, for example, accumulate event data over many events and then perform one or more classification tasks based on the accumulated events. The examples of FIGS. 2A, 2B, 3A, 3B, 3C, 4A, 4B, 5A, 5B, 6A, 6B, 7A, 7B, and 8 could be modified to first receive event data for plural events, perform one or more accumulation techniques to accumulate the data associated with the plural events in some manner, and then proceed to process the accumulated data for the plural events according to the various techniques described therein. As another particular example, the example of FIG. 9 is with respect to receiving generative text associated with a single event. The example of FIG. 9 could be modified to receive generative text associated with plural events, and then proceed to provide that generative text as input to a machine learning model associated with a classification task. Alternatively, the example of FIG. 9 could be modified to receive plural items of generative text, with each of the plural generative texts being associated with its own single event; combine the plural items of generative text into a combined text, and the proceed to provide that combined text as input to a machine learning model associated with a classification task.

Figure 10:
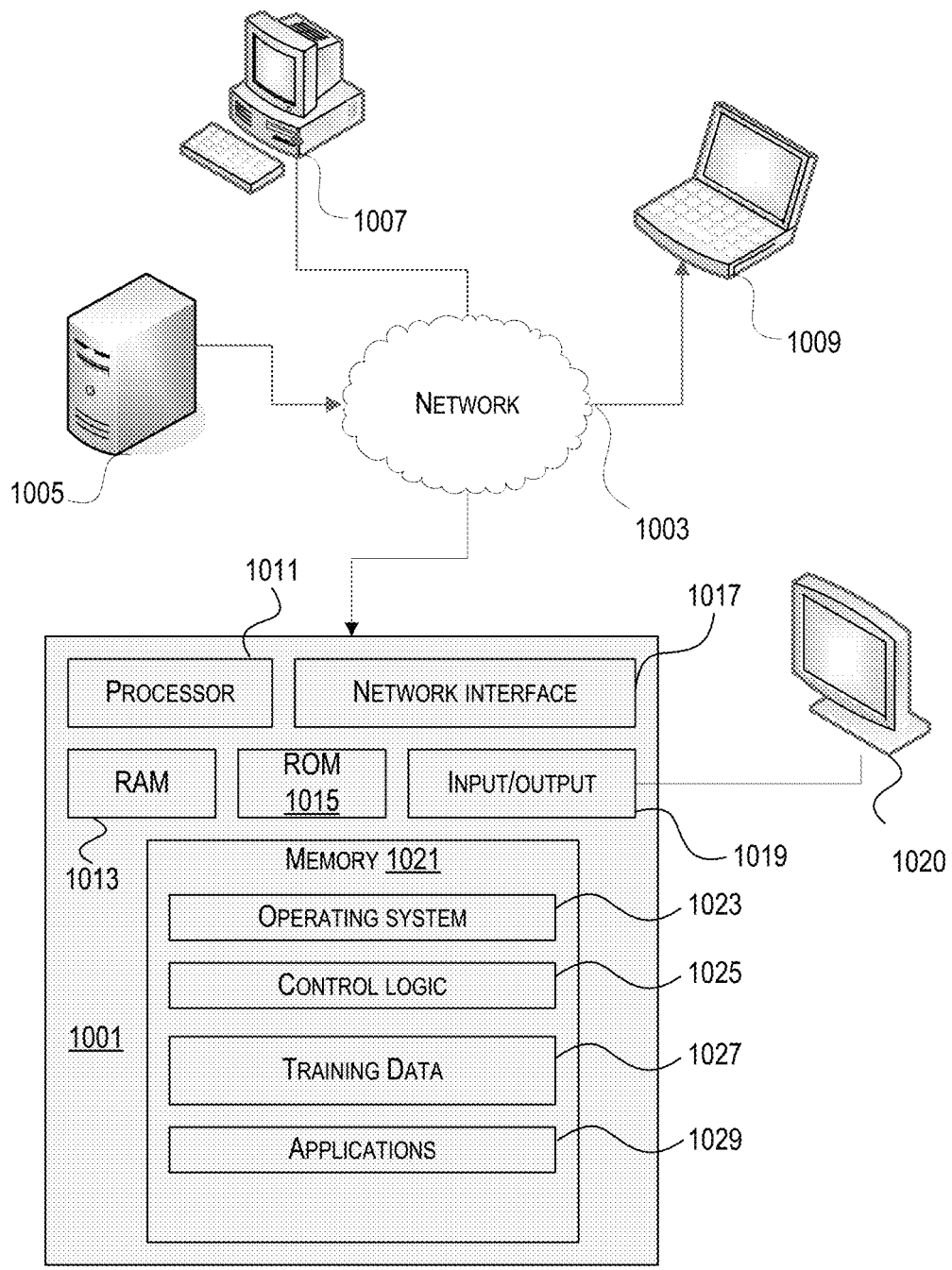
FIG. 10 depicts an example of a computing device that may be used in implementing one or more aspects described herein.

The computing device 1001 may operate in a standalone environment or a networked environment. As shown in FIG. 10, various network nodes 1001, 1005, 1007, and 1009 may be interconnected via a network 1003, such as the Internet. Other networks may also or alternatively be used, including private intranets, corporate networks, LANs, wireless networks, personal networks (PAN), and the like. Network 1003 is for illustration purposes and may be replaced with fewer or additional computer networks. A local area network (LAN) may have one or more of any known LAN topology and may use one or more of a variety of different protocols, such as Ethernet. Devices 1001, 1005, 1007, 1009 and other devices (not shown) may be connected to one or more of the networks via twisted pair wires, coaxial cable, fiber optics, radio waves or other communication media.

As seen in FIG. 10, the computing device 1001 may include a processor 1011, RAM 1013, ROM 1015, network interface 1017, input/output interfaces 1019 (e.g., keyboard, mouse, display, printer, etc.), and memory 1021. Processor 1011 may include one or more computer processing units (CPUs), graphical processing units (GPUs), and/or other processing units such as a processor adapted to perform computations associated with speech processing or other forms of machine learning. I/O 1019 may include a variety of interface units and drives for reading, writing, displaying, and/or printing data or files. I/O 1019 may be coupled with a display such as display 1020. Memory 1021 may store software for configuring computing device 1001 into a special purpose computing device in order to perform one or more of the various functions discussed herein. Memory 1021 may store operating system software 1023 for controlling overall operation of the computing device 1001, control logic 1025 for instructing computing device 1001 to perform aspects discussed herein, training data 1027, and other applications 1029. The computing device 1001 may include two or more of any and/or all of these components (e.g., two or more processors, two or more memories, etc.) and/or other components and/or subsystems not illustrated here.

Devices 1005, 1007, 1009 may have similar or different architecture as described with respect to computing device 1001. Those of skill in the art will appreciate that the functionality of computing device 1001 (or device 1005, 1007, 1009) as described herein may be spread across multiple data processing devices, for example, to distribute processing load across multiple computers, to segregate transactions based on geographic location, user access level, quality of service (QOS), etc. For example, devices 1001, 1005, 1007, 1009, and others may operate in concert to provide parallel computing features in support of the operation of control logic 1025.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Many example embodiments are listed below in accordance with one or more aspects disclosed herein. Although many of the example embodiments listed below are described as depending from other embodiments, the dependencies are not so limited. For example, the below example embodiments are shown as three different sets of example embodiments, with each set having its own particular dependencies. These dependencies are not limited to the exact manner shown in the three sets. As contemplated by this disclosure, one or more features in the three sets of example embodiments can be combined with other features in the example embodiments, or from the above discussion, in any manner.

First Set of Example Embodiments

Embodiment #1: A method comprising:
receiving, by one or more computing devices, first event data that includes a plurality of data values for a first event;
for a first data value of the plurality of data values, determining, by the one or more computing devices, a first alphanumeric representation based on a frequency of occurrence of the first data value;
for a second data value of the plurality of data values, determining, by the one or more computing devices, a second alphanumeric representation based on a comparison of the second data value to a threshold value;
for a third data value of the plurality of data values, determining, by the one or more computing devices, a third alphanumeric representation based on the third data value;
determining, by the one or more computing devices, a first sequential data token for the first event that includes the first alphanumeric representation, the second alphanumeric representation, and the third alphanumeric representation in a sequential order;
providing, by the one or more computing devices, the first sequential data token as input to a first language model that outputs generative text;
based on the first sequential data token, receiving, by the one or more computing devices, first generative text from the first language model; and
sending, by the one or more computing devices, the first generative text for use as input to one or more machine-learning models associated with a classification task for the first event data.

Embodiment #2: The method of embodiment #1, further comprising:
determining a plurality of sequential data tokens based on the first event data, wherein the first sequential data token is one of the plurality of sequential data tokens;
providing the plurality of sequential data tokens as input to a plurality of language models, wherein the first language model is one of the plurality of language models, and wherein providing the first sequential data token is performed as part of providing the plurality of sequential data tokens as input to the plurality of language models;
based on the plurality of sequential data tokens, receiving generative text from each of the plurality of language models, wherein receiving the first generative text is performed as part of receiving generative text from each of the plurality of language models; and
determining to use the first generative text for the classification task based on providing the generative text received from each of the plurality of language models as input to a machine-learning model that is configured to provide an indication of which language model to use for the classification task;
wherein sending the first generative text for use as input to the one or more machine-learning models associated with the classification task is performed based on determining to use the first generative text for the classification task.

Embodiment #3: The method of embodiment #1 further comprising:
determining, by the one or more computing devices, a second sequential data token for the first event based on inserting the first data value and the second data value into a natural language template for the first event data;
providing, by the one or more computing devices, the second sequential data token as input to a second language model that outputs generative text; and
based on the second sequential data token, receiving, by the one or more computing devices, second generative text from the second language model.

Embodiment #4: The method of embodiment #1 further comprising:
determining, by the one or more computing devices, a second sequential data token by applying an index lookup to the first data value to form an indexed version of the first data value, applying an embedding lookup to the indexed version of the first data value to form a first embedding, applying a linear projection to the second data value to form a second embedding, and by combining the first embedding and the second embedding;
providing, by the one or more computing devices, the second sequential data token as input to a second language model that outputs generative text; and
based on the second sequential data token, receiving, by the one or more computing devices, second generative text from the second language model.

Embodiment #5: The method of embodiment #1 further comprising:
determining, by the one or more computing devices, a second sequential data token for the first event based on an optimization process that selects a subset of data values to include as part of the second sequential data token;
providing, by the one or more computing devices, the second sequential data token as input to a second language model that outputs generative text; and
based on the second sequential data token, receiving, by the one or more computing devices, second generative text from the second language model.

Embodiment #6: The method of embodiment #5, wherein the optimization process includes performing a Bayesian optimization loop that optimizes based a target variable for the second sequential data token.

Embodiment #7: The method of embodiment #1, wherein the first event data includes a credit card transaction, the first data value indicates a merchant identifier, the second data value indicates an amount of the credit card transaction, and the third data value indicates whether a credit card was physically present for the credit card transaction;
wherein the threshold value is configured based on a selected level of granularity; and
wherein the second alphanumeric representation indicates the selected level of granularity and indicates that the amount of the credit card transaction is within a range of prices.

Embodiment #8: The method of embodiment #1, wherein the first event data includes an account transaction, the first data value indicates a type of account, the second data value indicates an amount for the account transaction, and the third data value indicates whether the transaction was automatic or manual.

Embodiment #9: The method of embodiment #1, wherein the first event data includes click stream data generated based on one or more user interactions with a user interface, the first data value indicates an identifier for an event initiated based on the one or more user interactions, the second data value indicates a time stamp for the event, and the third data value indicates a type of platform associated with the event.

Embodiment #10: The method of embodiment #1, wherein the classification task is associated with detecting fraud associated with an account.

Embodiment #11: An apparatus comprising:
  one or more processors; and
  memory storing executable instructions that, when executed by the one or more processors, cause the apparatus to:
    receive first event data that includes a plurality of data values for a first event;
    for a first data value of the plurality of data values, determine a first alphanumeric representation based on a frequency of occurrence of the first data value;
    for a second data value of the plurality of data values, determine a second alphanumeric representation based on a comparison of the second data value to a threshold value;
    for a third data value of the plurality of data values, determine a third alphanumeric representation based on the third data value;
    determine a first sequential data token for the first event that includes the first alphanumeric representation, the second alphanumeric representation, and the third alphanumeric representation in a sequential order;
    provide the first sequential data token as input to a first language model that outputs generative text;
    based on the first sequential data token, receive first generative text from the first language model; and
    send the first generative text for use as input to one or more machine-learning models associated with a classification task for the first event data.

Embodiment #12: The apparatus of embodiment #11, wherein the executable instructions, when executed by the one or more processors, cause the apparatus to:
  determine a plurality of sequential data tokens based on the first event data, wherein the first sequential data token is one of the plurality of sequential data tokens;
  provide the plurality of sequential data tokens as input to a plurality of language models, wherein the first language model is one of the plurality of language models, and wherein the executable instructions, when executed by the one or more processors, cause the apparatus to provide the first sequential data token as part of the plurality of sequential data tokens that are provided as input to the plurality of language models;
  based on the plurality of sequential data tokens, receive generative text from each of the plurality of language models, wherein the executable instructions, when executed by the one or more processors, cause the apparatus to receive the first generative text as part of the generative text received from each of the plurality of language models; and
  determine to use the first generative text for the classification task based on providing the generative text received from each of the plurality of language models as input to a machine-learning model that is configured to provide an indication of which language model to use for the classification task;
  wherein the executable instructions that, when executed by the one or more processors, cause the apparatus to send the first generative text for use as input to the one or more machine-learning models associated with the classification task based on determining to use the first generative text for the classification task.

Embodiment #13: The apparatus of embodiment #11, wherein the executable instructions, when executed by the one or more processors, cause the apparatus to:
  determine a second sequential data token for the first event based on inserting the first data value and the second data value into a natural language template for the first event data;
  provide the second sequential data token as input to a second language model that outputs generative text; and
  based on the second sequential data token, receive second generative text from the second language model.

Embodiment #14: The apparatus of embodiment #11, wherein the executable instructions, when executed by the one or more processors, cause the apparatus to:
  determine a second sequential data token by applying an index lookup to the first data value to form an indexed version of the first data value, applying an embedding lookup to the indexed version of the first data value to form a first embedding, applying a linear projection to the second data value to form a second embedding, and by combining the first embedding and the second embedding;
  provide the second sequential data token as input to a second language model that outputs generative text; and
  based on the second sequential data token, receive second generative text from the second language model.

Embodiment #15: The apparatus of embodiment #11, wherein the executable instructions, when executed by the one or more processors, cause the apparatus to:
  determine a second sequential data token for the first event based on an optimization process that selects a subset of data values to include as part of the second sequential data token;
  provide the second sequential data token as input to a second language model that outputs generative text; and
  based on the second sequential data token, receive second generative text from the second language model.

Embodiment #16: The apparatus of embodiment #11, wherein the first event data includes a credit card transaction, the first data value indicates a merchant identifier, the second data value indicates an amount of the credit card transaction, and the third data value indicates whether a credit card was physically present for the credit card transaction;
  wherein the threshold value is configured based on a selected level of granularity; and
  wherein the second alphanumeric representation indicates the selected level of granularity and indicates that the amount of the credit card transaction is within a range of prices.

Embodiment #17. One or more non-transitory computer-readable media storing executable instructions that, when executed, cause one or more computing devices to:
  receive first event data that includes a plurality of data values for a first event;
  for a first data value of the plurality of data values, determine a first alphanumeric representation based on a frequency of occurrence of the first data value;
  for a second data value of the plurality of data values, determine a second alphanumeric representation based on a comparison of the second data value to a threshold value;

for a third data value of the plurality of data values, determine a third alphanumeric representation based on the third data value;

determine a first sequential data token for the first event that includes the first alphanumeric representation, the second alphanumeric representation, and the third alphanumeric representation in a sequential order;

provide the first sequential data token as input to a first language model that outputs generative text;

based on the first sequential data token, receive first generative text from the first language model; and send the first generative text for use as input to one or more machine-learning models associated with a classification task for the first event data.

Embodiment #18: The one or more non-transitory computer-readable media of embodiment #17, wherein the executable instructions, when executed, cause the one or more computing devices to:

determine a plurality of sequential data tokens based on the first event data, wherein the first sequential data token is one of the plurality of sequential data tokens;

provide the plurality of sequential data tokens as input to a plurality of language models, wherein the first language model is one of the plurality of language models, and wherein the executable instructions, when executed, cause the one or more computing devices to provide the first sequential data token as part of the plurality of sequential data tokens that are provided as input to the plurality of language models;

based on the plurality of sequential data tokens, receive generative text from each of the plurality of language models, wherein the executable instructions, when executed, cause the one or more computing devices to receive the first generative text as part of the generative text received from each of the plurality of language models; and determine to use the first generative text for the classification task based on providing the generative text received from each of the plurality of language models as input to a machine-learning model that is configured to provide an indication of which language model to use for the classification task;

wherein the executable instructions that, when executed, cause the one or more computing devices to send the first generative text for use as input to the one or more machine-learning models associated with the classification task based on determining to use the first generative text for the classification task.

Embodiment #19: The one or more non-transitory computer-readable media of embodiment #17, wherein the executable instructions, when executed, cause the one or more computing devices to:

determine a second sequential data token for the first event based on inserting the first data value and the second data value into a natural language template for the first event data;

provide the second sequential data token as input to a second language model that outputs generative text; and based on the second sequential data token, receive second generative text from the second language model.

Embodiment #20: The one or more non-transitory computer-readable media of embodiment #17, wherein the executable instructions, when executed, cause the one or more computing devices to:

determine a second sequential data token by applying an index lookup to the first data value to form an indexed version of the first data value, applying an embedding lookup to the indexed version of the first data value to form a first embedding, applying a linear projection to the second data value to form a second embedding, and by combining the first embedding and the second embedding;

provide the second sequential data token as input to a second language model that outputs generative text; and based on the second sequential data token, receive second generative text from the second language model.

Second Set of Example Embodiments

Embodiment #21: A method comprising:

determining, by the one or more computing devices, clusters by applying a clustering technique to a corpus of event data;

determining, by the one or more computing devices, a grid-based version of the clusters by applying a grid technique to the clusters, wherein the grid technique is based on a grid of cells configured to translate the clusters into a plurality of token values, wherein each cell of the grid of cells is assigned with a token value of the plurality of token values;

receiving, by one or more computing devices, first event data that includes a plurality of data values, wherein the first event data is formatted in rows or columns;

determining, by the one or more computing devices, a first sequential data token based on the grid-based version of the clusters;

providing, by the one or more computing devices, the first sequential data token as input to a first language model that outputs generative text;

based on the first sequential data token, receiving, by the one or more computing devices, first generative text from the first language model; and sending, by the one or more computing devices, the first generative text for use as input to one or more machine-learning models associated with a classification task.

Embodiment #22: The method of embodiment #21, wherein the grid-based version of the clusters, based on the grid technique, partitions the clusters among the grid of cells, and wherein the sequential data token includes text that indicates a range to which a first data value of the first event data is within.

Embodiment #23: The method of embodiment #21, wherein the grid-based version of the clusters, based on the grid technique, partitions the clusters among the grid of cells, and wherein the sequential data token includes text that is assigned to a first cell of the grid-based version.

Embodiment #24: The method of embodiment #21, wherein a first cluster of the clusters is assigned to a first cell of the grid of cells, and wherein a second cluster of the clusters is assigned to a second cell of the grid-based version.

Embodiment #25: The method of embodiment #21, wherein the first event data includes a credit card transaction, and wherein the sequential data token indicates, for the credit card transaction, a merchant identifier, an amount of the credit card transaction, and whether a credit card was physically present for the credit card transaction.

Embodiment #26: The method of embodiment #21, wherein the first event data includes an account transaction, and wherein the sequential data token indicates, for the account transaction, a type of account, an amount for the account transaction, and whether the account transaction was automatic or manual.

Embodiment #27: The method of embodiment #21, wherein the first event data includes click stream data generated based on one or more user interactions with a user interface, and
    wherein the sequential data token indicates, for the account transaction, an identifier for an event initiated based on the one or more user interactions, a time stamp for the event, and a type of platform associated with the event.

Embodiment #28: The method of embodiment #21, wherein the classification task is associated with detecting fraud associated with an account.

Embodiment #29: The method of embodiment #21, further comprising:
    performing the classification task using the one or more machine learning models associated with the classification task.

Embodiment #30: An apparatus comprising:
    one or more processors; and
    memory storing executable instructions that, when executed by the one or more processors, cause the apparatus to:
        determine clusters by applying a clustering technique to a corpus of event data;
        determine a grid-based version of the clusters by applying a grid technique to the clusters, wherein the grid technique is based on a grid of cells configured to translate the clusters into a plurality of token values, wherein each cell of the grid of cells is assigned with a token value of the plurality of token values;
        receive first event data that includes a plurality of data values, wherein the first event data is formatted in rows or columns;
        determine a first sequential data token based on the grid-based version of the clusters;
        provide the first sequential data token as input to a first language model that outputs generative text;
        based on the first sequential data token, receive first generative text from the first language model; and
        send the first generative text for use as input to one or more machine-learning models associated with a classification task.

Embodiment #31: The apparatus of embodiment #30, wherein the grid-based version of the clusters, based on the grid technique, partitions the clusters among the grid of cells, and wherein the sequential data token includes text that indicates a range to which a first data value of the first event data is within.

Embodiment #32: The apparatus of embodiment #30, wherein the grid-based version of the clusters, based on the grid technique, partitions the clusters among the grid of cells, and wherein the sequential data token includes text that is assigned to a cell of the grid-based version.

Embodiment #33: The apparatus of embodiment #30, wherein the first tabular data includes a credit card transaction, and
    wherein the sequential data token indicates, for the credit card transaction, a merchant identifier, an amount of the credit card transaction, and whether a credit card was physically present for the credit card transaction.

Embodiment #34: The apparatus of embodiment #30, wherein the first tabular data includes an account transaction, and
    wherein the sequential data token indicates, for the account transaction, a type of account, an amount for the account transaction, and whether the account transaction was automatic or manual.

Embodiment #35: The apparatus of embodiment #30, wherein the first tabular data includes click stream data generated based on one or more user interactions with a user interface, and
    wherein the sequential data token indicates, for the account transaction, an identifier for an event initiated based on the one or more user interactions, a time stamp for the event, and a type of platform associated with the event.

Embodiment #36: The apparatus of embodiment #30, wherein the executable instructions, when executed, cause the apparatus to:
    perform the classification task using the one or more machine learning models associated with the classification task.

Embodiment #37: One or more non-transitory computer-readable media storing executable instructions that, when executed, cause one or more computing devices to:
    determine clusters by applying a clustering technique to a corpus of event data;
    determine a grid-based version of the clusters by applying a grid technique to the clusters, wherein the grid technique is based on a grid of cells configured to translate the clusters into a plurality of token values, wherein each cell of the grid of cells is assigned with a token value of the plurality of token values;
    receive first event data that includes a plurality of data values, wherein the first event data is formatted in rows or columns;
    determine a first sequential data token based on the grid-based version of the clusters;
    provide the first sequential data token as input to a first language model that outputs generative text;
    based on the first sequential data token, receive first generative text from the first language model; and
    send the first generative text for use as input to one or more machine-learning models associated with a classification task.

Embodiment #38: The one or more non-transitory computer-readable media of embodiment #37, wherein the grid-based version of the clusters, based on the grid technique, partitions the clusters among the grid of cells, and wherein the sequential data token includes text that indicates a range to which a first data value of the first event data is within.

Embodiment #39: The one or more non-transitory computer-readable media of embodiment #37, wherein the grid-based version of the clusters, based on the grid technique, partitions the clusters among the grid of cells, and wherein the sequential data token includes text that is assigned to a cell of the grid-based version.

Embodiment #40: The one or more non-transitory computer-readable media of embodiment #37, wherein the first tabular data includes a credit card transaction, and
    wherein the sequential data token indicates, for the credit card transaction, a merchant identifier, an amount of the credit card transaction, and whether a credit card was physically present for the credit card transaction.

Third Set of Example Embodiments

Embodiment #41: A method comprising:
    configuring a decision tree based on a selected event type and a selected number of categories, wherein, after being configured, the decision tree includes a plurality of paths through the decision tree, and wherein each of the plurality of paths is indicated by a combination of the categories for the path;

receiving, by one or more computing devices, first event data that includes one or more data values for a first event;

determining, by the one or more computing devices, a first sequential data token for the first event based on a first path through the decision tree that is traversed based on the one or more data values for the first event, wherein the first sequential data token includes an indication of a first combination of categories for the first path;

providing, by the one or more computing devices, the first sequential data token as input to a first language model that outputs generative text;

based on the first sequential data token, receiving, by the one or more computing devices, first generative text from the first language model; and sending, by the one or more computing devices, the first generative text for use as input to one or more machine-learning models associated with a classification task for the first event data.

Embodiment #42: The method of embodiment #41, further comprising:

determining a plurality of sequential data tokens based on the first event data, wherein the first sequential data token is one of the plurality of sequential data tokens;

providing the plurality of sequential data tokens as input to a plurality of language models, wherein the first language model is one of the plurality of language models, and wherein providing the first sequential data token is performed as part of providing the plurality of sequential data tokens as input to the plurality of language models;

based on the plurality of sequential data tokens, receiving generative text from each of the plurality of language models, wherein receiving the first generative text is performed as part of receiving generative text from each of the plurality of language models; and determining to use the first generative text for the classification task based on providing the generative text received from each of the plurality of language models as input to a machine-learning model that is configured to provide an indication of which language model to use for the classification task;

wherein sending the first generative text for use as input to the one or more machine-learning models associated with the classification task is performed based on determining to use the first generative text for the classification task.

Embodiment #43: The method of embodiment #41 further comprising:

determining, by the one or more computing devices, a second sequential data token for the first event based on inserting the first data value and the second data value into a natural language template for the first event data;

providing, by the one or more computing devices, the second sequential data token as input to a second language model that outputs generative text; and based on the second sequential data token, receiving, by the one or more computing devices, second generative text from the second language model.

Embodiment #44: The method of embodiment #41 further comprising:

determining, by the one or more computing devices, a second sequential data token for the first event based on an index lookup being applied to at least one of the first data value, the second data value, and/or the third data value;

determining, by the one or more computing devices, an event embedding vector by applying an embedding lookup to a first portion of the second sequential data token and by applying a linear projection to a second portion of the second sequential data token;

providing, by the one or more computing devices, the event embedding vector as input to a second language model that outputs generative text; and based on the second sequential data token, receiving, by the one or more computing devices, second generative text from the second language model.

Embodiment #45: The method of embodiment #41 further comprising:

determining, by the one or more computing devices, a second sequential data token for the first event based on an optimization process that selects a subset of data values to include as part of the second sequential data token;

providing, by the one or more computing devices, the second sequential data token as input to a second language model that outputs generative text; and based on the second sequential data token, receiving, by the one or more computing devices, second generative text from the second language model.

Embodiment #46: The method of embodiment #41, wherein the optimization process includes performing a Bayesian optimization loop that optimizes based a target variable for the second sequential data token.

Embodiment #47: The method of embodiment #41, further comprising:

for a first data value of the one or more data values, determining, by the one or more computing devices, a first alphanumeric representation based on a frequency of occurrence of the first data value;

for a second data value of the one or more data values, determining, by the one or more computing devices, a second alphanumeric representation based on a comparison of the second data value to a threshold value;

for a third data value of the one or more data values, determining, by the one or more computing devices, a third alphanumeric representation based on the third data value;

determining, by the one or more computing devices, a second sequential data token for the first event that includes the first alphanumeric representation, the second alphanumeric representation, and the third alphanumeric representation in a sequential order;

providing the second sequential data token as input to a second language model that outputs generative text; and based on the second sequential data token, receiving second generative text from the second language model.

Embodiment #48: The method of embodiment #41, wherein the classification task is associated with detecting fraud associated with an account.

Embodiment #49: An apparatus comprising:

one or more processors; and memory storing executable instructions that, when executed by the one or more processors, cause the apparatus to:

configure a decision tree based on a selected event type and a selected number of categories, wherein, after being configured, the decision tree includes a plurality of paths through the decision tree, and wherein each of the plurality of paths is indicated by a combination of the categories for the path;

receive first event data that includes one or more data values for a first event;

determine a first sequential data token for the first event based on a first path through the decision tree that is traversed based on the one or more data values for the first event, wherein the first sequential data token includes an indication of a first combination of categories for the first path;

provide the first sequential data token as input to a first language model that outputs generative text;

based on the first sequential data token, receive first generative text from the first language model; and send the first generative text for use as input to one or more machine-learning models associated with a classification task for the first event data.

Embodiment #50: The apparatus of embodiment #49, wherein the executable instructions, when executed by the one or more processors, cause the apparatus to:

determine a plurality of sequential data tokens based on the first event data, wherein the first sequential data token is one of the plurality of sequential data tokens;

provide the plurality of sequential data tokens as input to a plurality of language models, wherein the first language model is one of the plurality of language models, and wherein the executable instructions, when executed by the one or more processors, cause the apparatus to provide the first sequential data token as part of the plurality of sequential data tokens that are provided as input to the plurality of language models;

based on the plurality of sequential data tokens, receive generative text from each of the plurality of language models, wherein the executable instructions, when executed by the one or more processors, cause the apparatus to receive the first generative text as part of the generative text received from each of the plurality of language models; and determine to use the first generative text for the classification task based on providing the generative text received from each of the plurality of language models as input to a machine-learning model that is configured to provide an indication of which language model to use for the classification task;

wherein the executable instructions that, when executed by the one or more processors, cause the apparatus to send the first generative text for use as input to the one or more machine-learning models associated with the classification task based on determining to use the first generative text for the classification task.

Embodiment #51: The apparatus of embodiment #49, wherein the executable instructions, when executed by the one or more processors, cause the apparatus to:

determine a second sequential data token for the first event based on inserting the first data value and the second data value into a natural language template for the first event data;

provide the second sequential data token as input to a second language model that outputs generative text; and based on the second sequential data token, receive second generative text from the second language model.

Embodiment #52: The apparatus of embodiment #49, wherein the executable instructions, when executed by the one or more processors, cause the apparatus to:

determine a second sequential data token for the first event based on an index lookup being applied to at least one of the first data value, the second data value, and/or the third data value;

determine an event embedding vector by applying an embedding lookup to a first portion of the second sequential data token and by applying a linear projection to a second portion of the second sequential data token;

provide the event embedding vector as input to a second language model that outputs generative text; and based on the second sequential data token, receive second generative text from the second language model.

Embodiment #53: The apparatus of embodiment #49, wherein the executable instructions, when executed by the one or more processors, cause the apparatus to:

determine a second sequential data token for the first event based on an optimization process that selects a subset of data values to include as part of the second sequential data token;

provide the second sequential data token as input to a second language model that outputs generative text; and based on the second sequential data token, receive second generative text from the second language model.

Embodiment #54: The apparatus of embodiment #49, wherein the executable instructions, when executed by the one or more processors, cause the apparatus to:

for a first data value of the one or more data values, determine a first alphanumeric representation based on a frequency of occurrence of the first data value;

for a second data value of the one or more data values, determine a second alphanumeric representation based on a comparison of the second data value to a threshold value;

for a third data value of the one or more data values, determine a third alphanumeric representation based on the third data value;

determine a second sequential data token for the first event that includes the first alphanumeric representation, the second alphanumeric representation, and the third alphanumeric representation in a sequential order;

provide the second sequential data token as input to a second language model that outputs generative text; and based on the second sequential data token, receive second generative text from the second language model.

Embodiment #55: One or more non-transitory computer-readable media storing executable instructions that, when executed, cause one or more computing devices to:

configure a decision tree based on a selected event type and a selected number of categories, wherein, after being configured, the decision tree includes a plurality of paths through the decision tree, and wherein each of the plurality of paths is indicated by a combination of the categories for the path;

receive first event data that includes one or more data values for a first event;

determine a first sequential data token for the first event based on a first path through the decision tree that is traversed based on the one or more data values for the first event, wherein the first sequential data token includes an indication of a first combination of categories for the first path;

provide the first sequential data token as input to a first language model that outputs generative text;

based on the first sequential data token, receive first generative text from the first language model; and send the first generative text for use as input to one or more machine-learning models associated with a classification task for the first event data.

Embodiment #56: The one or more non-transitory computer-readable media of embodiment #55, wherein the executable instructions, when executed, cause the one or more computing devices to:
  determine a plurality of sequential data tokens based on the first event data, wherein the first sequential data token is one of the plurality of sequential data tokens;
  provide the plurality of sequential data tokens as input to a plurality of language models, wherein the first language model is one of the plurality of language models, and wherein the executable instructions, when executed, cause the one or more computing devices to provide the first sequential data token as part of the plurality of sequential data tokens that are provided as input to the plurality of language models;
  based on the plurality of sequential data tokens, receive generative text from each of the plurality of language models, wherein the executable instructions, when executed, cause the one or more computing devices to receive the first generative text as part of the generative text received from each of the plurality of language models; and
  determine to use the first generative text for the classification task based on providing the generative text received from each of the plurality of language models as input to a machine-learning model that is configured to provide an indication of which language model to use for the classification task;
  wherein the executable instructions that, when executed, cause the one or more computing devices to send the first generative text for use as input to the one or more machine-learning models associated with the classification task based on determining to use the first generative text for the classification task.

Embodiment #57: The one or more non-transitory computer-readable media of embodiment #55, wherein the executable instructions, when executed, cause the one or more computing devices to:
  determine a second sequential data token for the first event based on inserting the first data value and the second data value into a natural language template for the first event data;
  provide the second sequential data token as input to a second language model that outputs generative text; and
  based on the second sequential data token, receive second generative text from the second language model.

Embodiment #58: The one or more non-transitory computer-readable media of embodiment #55, wherein the executable instructions, when executed, cause the one or more computing devices to:
  determine a second sequential data token for the first event based on an index lookup being applied to at least one of the first data value, the second data value, and/or the third data value;
  determine an event embedding vector by applying an embedding lookup to a first portion of the second sequential data token and by applying a linear projection to a second portion of the second sequential data token;
  provide the event embedding vector as input to a second language model that outputs generative text; and
  based on the second sequential data token, receive second generative text from the second language model.

Embodiment #59: The one or more non-transitory computer-readable media of embodiment #55, wherein the executable instructions, when executed, cause the one or more computing devices to:
  determine a second sequential data token for the first event based on an optimization process that selects a subset of data values to include as part of the second sequential data token;
  provide the second sequential data token as input to a second language model that outputs generative text; and
  based on the second sequential data token, receive second generative text from the second language model.

Embodiment #60: The one or more non-transitory computer-readable media of embodiment #55, wherein the executable instructions, when executed, cause the one or more computing devices to:
  for a first data value of the one or more data values, determine a first alphanumeric representation based on a frequency of occurrence of the first data value;
  for a second data value of the one or more data values, determine a second alphanumeric representation based on a comparison of the second data value to a threshold value;
  for a third data value of the one or more data values, determine a third alphanumeric representation based on the third data value;
  determine a second sequential data token for the first event that includes the first alphanumeric representation, the second alphanumeric representation, and the third alphanumeric representation in a sequential order;
  provide the second sequential data token as input to a second language model that outputs generative text; and
  based on the second sequential data token, receive second generative text from the second language model.

Although the subject matter has been described in language specific to structural features and/or methodological acts, it is to be understood that the subject matter defined in any claim is not necessarily limited to the specific features or acts described above. Rather, the specific features and acts described above are disclosed as example forms of implementing any claim or any of the appended claims.

We claim:
1. A method comprising:
  receiving, by one or more computing devices, first event data that includes a plurality of data values for a first event;
  for a first data value of the plurality of data values, determining, by the one or more computing devices, a first alphanumeric representation based on a frequency of occurrence of the first data value;
  for a second data value of the plurality of data values, determining, by the one or more computing devices, a second alphanumeric representation based on a comparison of the second data value to a threshold value;
  for a third data value of the plurality of data values, determining, by the one or more computing devices, a third alphanumeric representation based on the third data value;
  determining, by the one or more computing devices, a first sequential data token for the first event that includes the first alphanumeric representation, the second alphanumeric representation, and the third alphanumeric representation in a sequential order;

providing, by the one or more computing devices, the first sequential data token as input to a first language model that outputs generative text;
based on the first sequential data token, receiving, by the one or more computing devices, first generative text from the first language model; and
sending, by the one or more computing devices, the first generative text for use as input to one or more machine-learning models associated with a classification task for the first event data.

2. The method of claim 1, further comprising:
determining a plurality of sequential data tokens based on the first event data, wherein the first sequential data token is one of the plurality of sequential data tokens;
providing the plurality of sequential data tokens as input to a plurality of language models, wherein the first language model is one of the plurality of language models, and wherein providing the first sequential data token is performed as part of providing the plurality of sequential data tokens as input to the plurality of language models;
based on the plurality of sequential data tokens, receiving generative text from each of the plurality of language models, wherein receiving the first generative text is performed as part of receiving generative text from each of the plurality of language models; and
determining to use the first generative text for the classification task based on providing the generative text received from each of the plurality of language models as input to a machine-learning model that is configured to provide an indication of which language model to use for the classification task;
wherein sending the first generative text for use as input to the one or more machine-learning models associated with the classification task is performed based on determining to use the first generative text for the classification task.

3. The method of claim 1 further comprising:
determining, by the one or more computing devices, a second sequential data token for the first event based on inserting the first data value and the second data value into a natural language template for the first event data;
providing, by the one or more computing devices, the second sequential data token as input to a second language model that outputs generative text; and
based on the second sequential data token, receiving, by the one or more computing devices, second generative text from the second language model.

4. The method of claim 1 further comprising:
determining, by the one or more computing devices, a second sequential data token by applying an index lookup to the first data value to form an indexed version of the first data value, applying an embedding lookup to the indexed version of the first data value to form a first embedding, applying a linear projection to the second data value to form a second embedding, and by combining the first embedding and the second embedding;
providing, by the one or more computing devices, the second sequential data token as input to a second language model that outputs generative text; and
based on the second sequential data token, receiving, by the one or more computing devices, second generative text from the second language model.

5. The method of claim 1 further comprising:
determining, by the one or more computing devices, a second sequential data token for the first event based on an optimization process that selects a subset of data values to include as part of the second sequential data token;
providing, by the one or more computing devices, the second sequential data token as input to a second language model that outputs generative text; and
based on the second sequential data token, receiving, by the one or more computing devices, second generative text from the second language model.

6. The method of claim 5, wherein the optimization process includes performing a Bayesian optimization loop that optimizes based a target variable for the second sequential data token.

7. The method of claim 1, wherein the first event data includes a credit card transaction, the first data value indicates a merchant identifier, the second data value indicates an amount of the credit card transaction, and the third data value indicates whether a credit card was physically present for the credit card transaction;
wherein the threshold value is configured based on a selected level of granularity; and
wherein the second alphanumeric representation indicates the selected level of granularity and indicates that the amount of the credit card transaction is within a range of prices.

8. The method of claim 1, wherein the first event data includes an account transaction, the first data value indicates a type of account, the second data value indicates an amount for the account transaction, and the third data value indicates whether the transaction was automatic or manual.

9. The method of claim 1, wherein the first event data includes click stream data generated based on one or more user interactions with a user interface, the first data value indicates an identifier for an event initiated based on the one or more user interactions, the second data value indicates a time stamp for the event, and the third data value indicates a type of platform associated with the event.

10. The method of claim 1, wherein the classification task is associated with detecting fraud associated with an account.

11. An apparatus comprising:
one or more processors; and
memory storing executable instructions that, when executed by the one or more processors, cause the apparatus to:
receive first event data that includes a plurality of data values for a first event;
for a first data value of the plurality of data values, determine a first alphanumeric representation based on a frequency of occurrence of the first data value;
for a second data value of the plurality of data values, determine a second alphanumeric representation based on a comparison of the second data value to a threshold value;
for a third data value of the plurality of data values, determine a third alphanumeric representation based on the third data value;
determine a first sequential data token for the first event that includes the first alphanumeric representation, the second alphanumeric representation, and the third alphanumeric representation in a sequential order;
provide the first sequential data token as input to a first language model that outputs generative text;
based on the first sequential data token, receive first generative text from the first language model; and send the first generative text for use as input to one or more machine-learning models associated with a classification task for the first event data.

12. The apparatus of claim 11, wherein the executable instructions, when executed by the one or more processors, cause the apparatus to:
   determine a plurality of sequential data tokens based on the first event data, wherein the first sequential data token is one of the plurality of sequential data tokens;
   provide the plurality of sequential data tokens as input to a plurality of language models, wherein the first language model is one of the plurality of language models, and wherein the executable instructions, when executed by the one or more processors, cause the apparatus to provide the first sequential data token as part of the plurality of sequential data tokens that are provided as input to the plurality of language models;
   based on the plurality of sequential data tokens, receive generative text from each of the plurality of language models, wherein the executable instructions, when executed by the one or more processors, cause the apparatus to receive the first generative text as part of the generative text received from each of the plurality of language models; and
   determine to use the first generative text for the classification task based on providing the generative text received from each of the plurality of language models as input to a machine-learning model that is configured to provide an indication of which language model to use for the classification task;
   wherein the executable instructions that, when executed by the one or more processors, cause the apparatus to send the first generative text for use as input to the one or more machine-learning models associated with the classification task based on determining to use the first generative text for the classification task.

13. The apparatus of claim 11, wherein the executable instructions, when executed by the one or more processors, cause the apparatus to:
   determine a second sequential data token for the first event based on inserting the first data value and the second data value into a natural language template for the first event data;
   provide the second sequential data token as input to a second language model that outputs generative text; and
   based on the second sequential data token, receive second generative text from the second language model.

14. The apparatus of claim 11, wherein the executable instructions, when executed by the one or more processors, cause the apparatus to:
   determine a second sequential data token by applying an index lookup to the first data value to form an indexed version of the first data value, applying an embedding lookup to the indexed version of the first data value to form a first embedding, applying a linear projection to the second data value to form a second embedding, and by combining the first embedding and the second embedding;
   provide the second sequential data token as input to a second language model that outputs generative text; and
   based on the second sequential data token, receive second generative text from the second language model.

15. The apparatus of claim 11, wherein the executable instructions, when executed by the one or more processors, cause the apparatus to:
   determine a second sequential data token for the first event based on an optimization process that selects a subset of data values to include as part of the second sequential data token;
   provide the second sequential data token as input to a second language model that outputs generative text; and
   based on the second sequential data token, receive second generative text from the second language model.

16. The apparatus of claim 11, wherein the first event data includes a credit card transaction, the first data value indicates a merchant identifier, the second data value indicates an amount of the credit card transaction, and the third data value indicates whether a credit card was physically present for the credit card transaction;
   wherein the threshold value is configured based on a selected level of granularity; and
   wherein the second alphanumeric representation indicates the selected level of granularity and indicates that the amount of the credit card transaction is within a range of prices.

17. One or more non-transitory computer-readable media storing executable instructions that, when executed, cause one or more computing devices to:
   receive first event data that includes a plurality of data values for a first event;
   for a first data value of the plurality of data values, determine a first alphanumeric representation based on a frequency of occurrence of the first data value;
   for a second data value of the plurality of data values, determine a second alphanumeric representation based on a comparison of the second data value to a threshold value;
   for a third data value of the plurality of data values, determine a third alphanumeric representation based on the third data value;
   determine a first sequential data token for the first event that includes the first alphanumeric representation, the second alphanumeric representation, and the third alphanumeric representation in a sequential order;
   provide the first sequential data token as input to a first language model that outputs generative text;
   based on the first sequential data token, receive first generative text from the first language model; and
   send the first generative text for use as input to one or more machine-learning models associated with a classification task for the first event data.

18. The one or more non-transitory computer-readable media of claim 17, wherein the executable instructions, when executed, cause the one or more computing devices to:
   determine a plurality of sequential data tokens based on the first event data, wherein the first sequential data token is one of the plurality of sequential data tokens;
   provide the plurality of sequential data tokens as input to a plurality of language models, wherein the first language model is one of the plurality of language models, and wherein the executable instructions, when executed, cause the one or more computing devices to provide the first sequential data token as part of the plurality of sequential data tokens that are provided as input to the plurality of language models;
   based on the plurality of sequential data tokens, receive generative text from each of the plurality of language models, wherein the executable instructions, when executed, cause the one or more computing devices to receive the first generative text as part of the generative text received from each of the plurality of language models; and determine to use the first generative text for the classification task based on providing the generative text received from each of the plurality of language models as input to a machine-learning model that is configured to provide an indication of which language model to use for the classification task;

wherein the executable instructions that, when executed, cause the one or more computing devices to send the first generative text for use as input to the one or more machine-learning models associated with the classification task based on determining to use the first generative text for the classification task.

19. The one or more non-transitory computer-readable media of claim 17, wherein the executable instructions, when executed, cause the one or more computing devices to:

determine a second sequential data token for the first event based on inserting the first data value and the second data value into a natural language template for the first event data;

provide the second sequential data token as input to a second language model that outputs generative text; and based on the second sequential data token, receive second generative text from the second language model.

20. The one or more non-transitory computer-readable media of claim 17, wherein the executable instructions, when executed, cause the one or more computing devices to:

determine a second sequential data token by applying an index lookup to the first data value to form an indexed version of the first data value, applying an embedding lookup to the indexed version of the first data value to form a first embedding, applying a linear projection to the second data value to form a second embedding, and by combining the first embedding and the second embedding;

provide the second sequential data token as input to a second language model that outputs generative text; and based on the second sequential data token, receive second generative text from the second language model.

\* \* \* \* \*